(12) United States Patent
Wang et al.

(10) Patent No.: US 11,898,665 B2
(45) Date of Patent: Feb. 13, 2024

(54) PIPELINE CONNECTION DEVICE AND PIPELINE ADAPTING ASSEMBLY

(71) Applicant: HANGZHOU SANHUA RESEARCH INSTITUTE CO., LTD., Hangzhou (CN)

(72) Inventors: Mei Wang, Hangzhou (CN); Li Li, Hangzhou (CN); Junqi Dong, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 242 days.

(21) Appl. No.: 17/312,933

(22) PCT Filed: Jan. 12, 2020

(86) PCT No.: PCT/CN2020/071621
§ 371 (c)(1),
(2) Date: Jun. 10, 2021

(87) PCT Pub. No.: WO2020/143820
PCT Pub. Date: Jul. 16, 2020

(65) Prior Publication Data
US 2022/0042626 A1 Feb. 10, 2022

(30) Foreign Application Priority Data

Jan. 11, 2019 (CN) .......................... 201920050471.1
Sep. 28, 2019 (CN) .......................... 201910928564.4

(51) Int. Cl.
| | |
|---|---|
| *F16L 23/16* | (2006.01) |
| *F16L 23/032* | (2006.01) |
| *F16L 19/02* | (2006.01) |
| *B60H 1/00* | (2006.01) |
| *F16L 15/00* | (2006.01) |

(52) U.S. Cl.
CPC ........ *F16L 15/008* (2013.01); *B60H 1/00571* (2013.01); *F16L 23/032* (2013.01); *F16L 23/16* (2013.01); *F16L 19/0206* (2013.01)

(58) Field of Classification Search
CPC ..... F16L 19/0206; F16L 23/032; F16L 23/16; F16L 23/0286; F16L 23/0283; F16L 23/18; F16L 23/024; B60H 1/00571
(Continued)

(56) References Cited

U.S. PATENT DOCUMENTS 1,178,714 A * 4/1916 Griffin ................... F16L 23/16
2,726,104 A * 12/1955 Boitnott
(Continued)

FOREIGN PATENT DOCUMENTS

| CN | 202327096 U | 7/2012 |
| CN | 203488880 U | 3/2014 |

(Continued)

OTHER PUBLICATIONS

JP-2011046794-A—Machine Translation—English (Year: 2011).*

*Primary Examiner* — William S. Choi
(74) *Attorney, Agent, or Firm* — Cheng-Ju Chiang

(57) ABSTRACT

A pipeline connection device includes a first connecting member, a second connecting member and a sealing member. The first connecting member includes a first channel and an abutting portion. The second connecting member includes a second channel and a first groove portion. The first groove portion includes a first side wall and a first receiving groove to receive the sealing member. At least part of the abutting portion is received in the first receiving groove and abuts against the sealing element. A first gap not greater than 0.3 mm is provided between the abutting portion and the first side wall; or the first connecting member and the second connecting member include at most two
(Continued)

annular friction surfaces. As a result, mutual jamming of the first connecting member and the second connecting member can be avoided. Besides, a pipeline adapting assembly having the pipeline connection device is disclosed.

13 Claims, 21 Drawing Sheets

(58) Field of Classification Search
USPC .............................. 285/413, 412, 368, 363
See application file for complete search history.

(56) References Cited

U.S. PATENT DOCUMENTS

| | | | | |
|---|---|---|---|---|
| 3,219,369 | A | * | 11/1965 | Little ...................... F16L 23/18 |
| 4,484,750 | A | * | 11/1984 | Scruggs |
| 5,308,125 | A | * | 5/1994 | Anderson, Jr. |
| 6,994,380 | B2 | * | 2/2006 | Cooke, Jr. |
| 8,523,244 | B2 | | 9/2013 | Schroeder |
| 2003/0080554 | A1 | | 5/2003 | Schroeder et al. |
| 2007/0236008 | A1 | * | 10/2007 | Kim .................... B60H 1/00571 |
| 2017/0059064 | A1 | * | 3/2017 | Thrift |

FOREIGN PATENT DOCUMENTS

| | | |
|---|---|---|
| CN | 206055895 U | 3/2017 |
| CN | 207555045 U | 6/2018 |
| CN | 208185693 U | 12/2018 |
| CN | 109519621 A | 3/2019 |
| CN | 209743815 U | 12/2019 |
| EP | 0187606 A1 | 7/1986 |
| JP | 2009-127809 A | 6/2009 |
| JP | 2011046794 A * | 3/2011 |

* cited by examiner

PIPELINE CONNECTION DEVICE AND PIPELINE ADAPTING ASSEMBLY

CROSS-REFERENCE TO RELATED APPLICATIONS

This application is a 35 U.S.C. § 371 National Phase conversion of International (PCT) Patent Application No. PCT/CN2020/071621, filed on Jan. 12, 2020, which requires priorities of a Chinese Patent Application No. 201920050471.1, filed on Jan. 11, 2019 and titled "PIPELINE CONNECTION DEVICE", and a Chinese Patent Application No. 201910928564.4, filed on Sep. 28, 2019 and titled "PIPELINE CONNECTION DEVICE AND PIPELINE ADAPTING ASSEMBLY", the entire contents of which are incorporated into this application herein by reference. The PCT International Patent Application was filed and published in Chinese.

TECHNICAL FIELD

The present disclosure relates to a field of refrigeration technology, and in particular to a pipeline connection device and a pipeline adapting assembly.

BACKGROUND

As a new type of refrigerant, $CO_2$ has been gradually used in air-conditioning systems, such as automotive air-conditioning systems. Due to the trans-critical cycle of the $CO_2$ refrigerant, its working pressure is about 10 times higher than that of the traditional refrigerant R134a, and therefore the connection and sealing of its pipelines face technical challenges.

At present, the pipes of the refrigeration system mostly use detachable pipe connection devices to connect the pipes of the refrigeration system. In the related pipeline connection structure, when a male connector and a female connector are matched, all the protrusions of the female connector are inserted into grooves of the male connector, which results in more mating surfaces between the male connector and the female connector, and the mutual force is greater. When assembling or disassembling the male connector and the female connector, it is necessary to overcome a relatively large frictional force between the male connector and the female connector to assemble or disassemble, which is inconvenient to operate.

SUMMARY

According to an embodiment of the present disclosure, it provides a pipeline connection device, comprising: a first connecting member, a second connecting member and a sealing member, the first connecting member and the second connecting member being fixedly connected, the first connecting member comprising a first channel and an abutting portion provided on an outer peripheral side of the first channel, the second connecting member comprising a second channel and a first groove portion provided on an outer peripheral side of the second channel, the first groove portion comprising a first receiving groove and a first side wall adjacent to the second channel;

the sealing member being received in the first receiving groove, at least part of the abutting portion being received in the first receiving groove and abutting against the sealing element;

wherein a first gap is provided between the abutting portion and the first side wall, and the first gap is not greater than 0.3 mm.

It can be seen from the above technical solution that the abutting portion is provided on the first connecting member, the first receiving groove is provided on the second connecting member, and a first gap is provided between the first side wall of the first receiving groove on the inner peripheral side and the abutting portion. By providing the first gap, the contact area between the first connecting member and the second connecting member is reduced, so that the possibility of them getting jamming with each other can be reduced. In addition, setting the range of the first gap to be no greater than 0.3 mm can well prevent other substances from entering the pipeline, for example, the debris generated by the extrusion of the sealing member or the impurities outside the connecting device, which is beneficial to ensure the effective operation of the heat exchange system.

The disclosure also relates to a pipeline connection device, comprising: a first connecting member, a second connecting member and a sealing member, the first connecting member and the second connecting member being adapted to fix together, the first connecting member comprising a first end portion, an abutting portion protruding from the first end portion in a direction away from the first connecting member, and a first channel extending through the abutting portion in an axial direction, the abutting portion being disposed around the first channel, the first connecting member comprising a channel accommodating portion; the second connecting member comprising a second end portion, a first isolation portion protruding from the second end portion in a direction away from the second connecting member, and a second channel extending through the first isolation portion in the axial direction, the first channel being in communication with the second channel, the sealing member being sleeved on an outside of the first isolation portion, the first isolation portion being at least partially received in the channel accommodating portion, the abutting portion abutting against the sealing member; the first connecting member and the second connecting member comprising annular friction surfaces in contact with each other, the number of the annular friction surfaces not exceeding two.

It can be seen from the above technical solution that by setting the number of annular friction surfaces between the first connecting member and the second connecting member to no more than two, the contact area of the first connecting member and the second connecting member is reduced, so that the possibility of them getting jamming with each other can be reduced.

The present disclosure also relates to a pipeline adapting assembly, comprising one of a heat exchanger, a flow regulating device, a gas-liquid separator and a compressor, and the aforementioned pipeline connection device;

the heat exchanger being connected to the pipeline connection device, at least one of an inlet and an outlet of the heat exchanger being in communication with the first channel or the second channel;

or, the flow regulating device being connected to the pipeline connection device, at least one of an inlet and an outlet of the flow regulating device being in communication with the first channel or the second channel;

or, the gas-liquid separator being connected to the pipeline connection device, at least one of an inlet and an outlet of the gas-liquid separator being in communication with the first channel or the second channel;

or, the compressor being connected to the pipeline connection device, at least one of an inlet and an outlet of the compressor being in communication with the first channel or the second channel.

Additional aspects and advantages of the present disclosure will be given in the following description.

DETAILED DESCRIPTION

Figure 1:
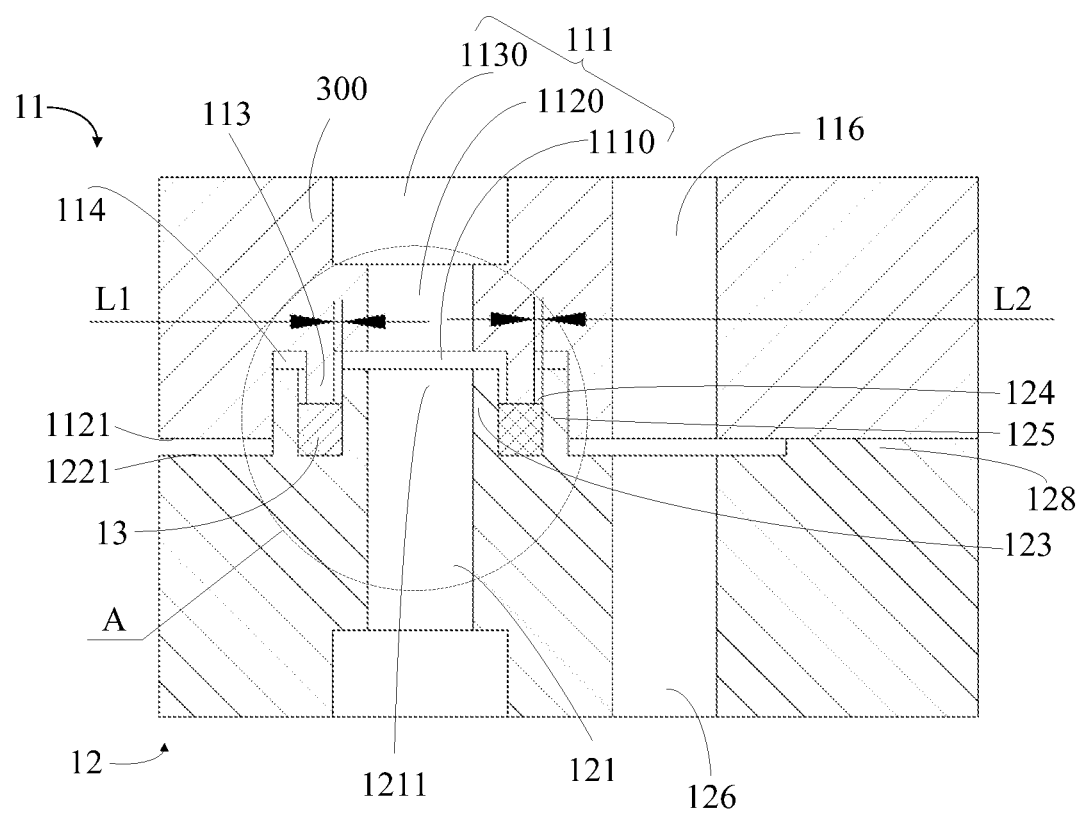
FIG. 1 is a cross-sectional view of a pipeline connection device in accordance with an exemplary embodiment of the present disclosure assembled in a first embodiment.
Figure 2:
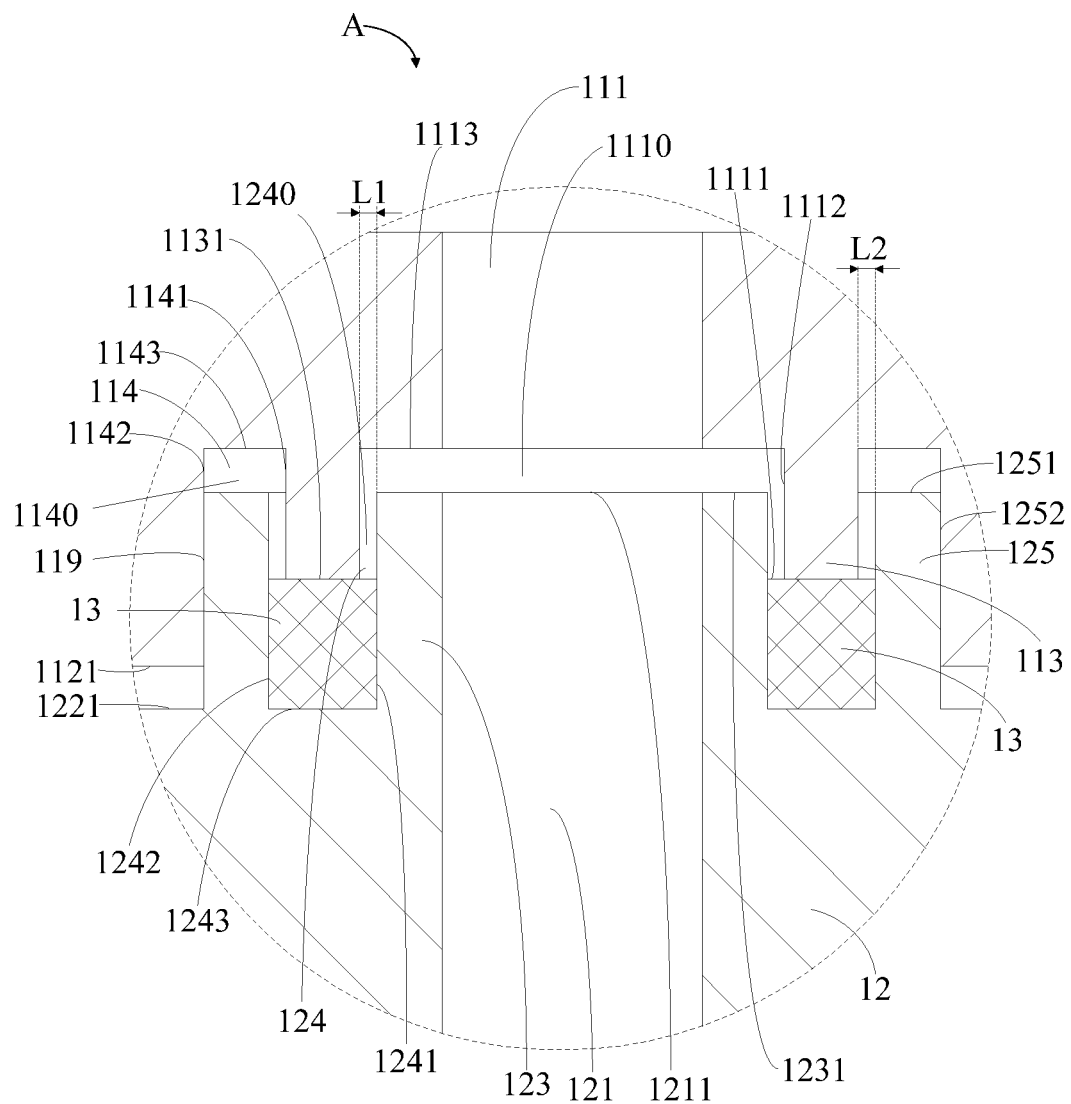
FIG. 2 is an enlarged schematic view of the pipeline connection device shown in FIG. 1 at a circle A.
Figure 3:
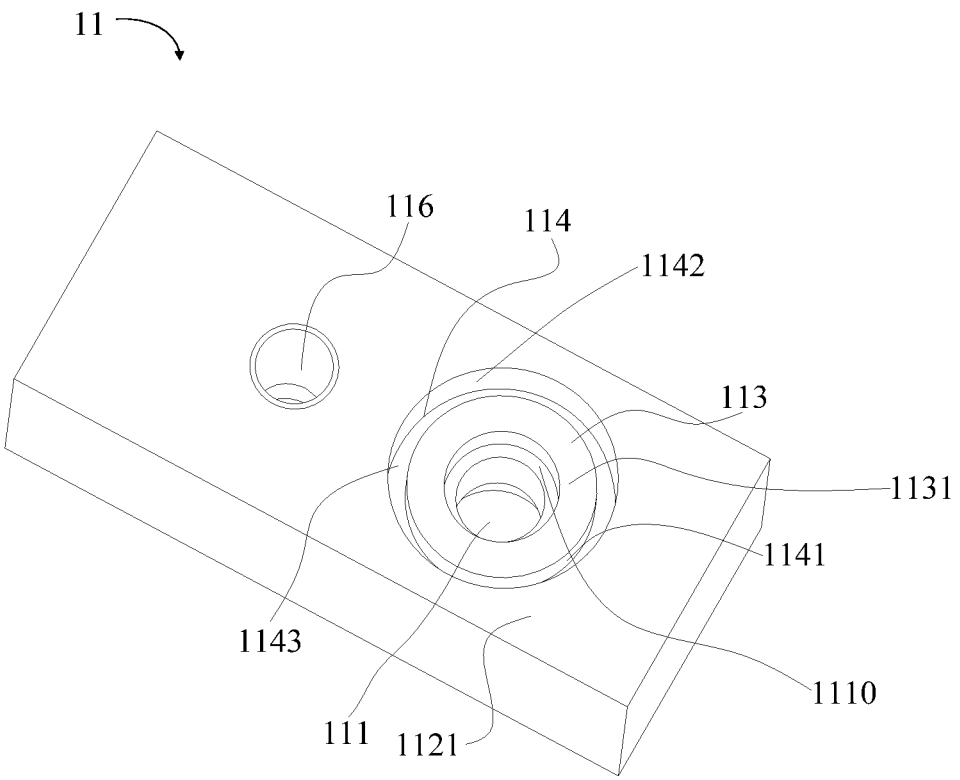
FIG. 3 is a schematic structural view of a first connecting member in FIG. 1 in an embodiment.

Embodiments of the present disclosure are described in detail below, and examples of the embodiments are shown in drawings. When the following description refers to the drawings, unless otherwise indicated, the same numbers in different drawings indicate the same or similar elements. The embodiments described in the following exemplary embodiments do not represent all embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" described in the present disclosure and appended claims are also intended to include plural forms, unless the context clearly indicates otherwise.

It should be understood that "first", "second" and similar words used in the specification and claims of the present disclosure do not denote any order, quantity or importance, but are only used to distinguish different components. Similarly, similar words such as "a" or "an" do not mean a quantity limit, but mean that there is at least one. A phrase such as "a plurality of" means two or more than two. Unless otherwise indicated, similar words such as "front", "rear", "lower" and/or "upper" are only for convenience of description, and are not limited to one position or one spatial orientation. Terms such as "including" or "comprising" and other similar words mean that the elements or components before "including" or "comprising" now cover the elements or components listed after "including" or "comprising" and their equivalents, and do not exclude other elements or components.

In the description of the present disclosure, it should be noted that, unless otherwise clearly specified and limited, the terms "installation", "connected" and "connection" should be understood in a broad meaning. For example, it can be a fixed connection, a detachable connection or an integral connection; it can be a mechanical connection or an electrical connection; it can be directly connected or indirectly connected through an intermediate medium, including the connection between two internal elements or the interaction between two elements. For those of ordinary skill in the art, the specific meanings of the above-mentioned terms in the present disclosure can be understood according to specific circumstances.

In the present disclosure, unless otherwise clearly defined and limited, a first feature located "upper" or "lower" of a second feature may include the first feature and the second feature are in direct contact with each other, or may include the first feature and the second feature are in direct contact but through other features therebetween. Moreover, the first feature located "above", "over" or "on top of" the second feature includes the first feature is directly above and obliquely above the second feature, or it simply means that the level of the first feature is higher than that of the second feature. The first feature located "below", "under" and "at bottom of" the second feature includes the first feature is directly below and obliquely below the second feature, or it simply means that the level of the first feature is lower than the second feature. The exemplary embodiments of the present disclosure will be described in detail below with reference to the drawings. In the case of no conflict, the following embodiments and features in the embodiments can be mutually supplemented or combined with each other.

The exemplary embodiments of the present disclosure will be described in detail below with reference to the drawings. In the case of no conflict, the following embodiments and features in the implementation can be mutually supplemented or combined.

FIG. 1 is a cross-sectional view of an assembled pipeline connection device 300 according to an exemplary embodiment of the present disclosure. Please refer to FIG. 1, and combine FIGS. 2 to 7 when necessary. The pipeline connection device 300 includes a first connecting member 11, a second connecting member 12 and a sealing member 13. The first connecting member 11 and the second connecting member 12 are fixedly connected. The first connecting member 11 includes a first channel 111 and an abutting portion 113 provided on an outer peripheral side of the first channel 111. The second connecting member 12 includes a second channel 121, a first isolation portion 123 and a first groove portion 124 provided on an outer peripheral side of the second channel 121. The first groove portion 124 includes a first receiving groove 1240, a first side wall 1241 located on an inner peripheral side of the first receiving groove 1240, a second side wall 1242 located on an outer peripheral side of the first receiving groove 1240, and a bottom wall 1243 located at a bottom of the first receiving groove 1240. The first isolation portion 123 is formed between the second channel 121 and the first receiving groove 1240. The sealing member 13 is disposed in the first receiving groove 1240. At least part of the abutting portion 113 extends into the first receiving groove 1240 and abuts against the sealing member 13. A first gap L1 is formed between the abutting portion 113 and the first side wall 1241. Through a large number of experiments, the inventors have found that when the first gap L1 is not greater than 0.3 mm, other substances can be well prevented from entering the first channel 111 and the second channel 121, thereby preventing the substances from entering the heat exchange system through the pipeline. For example, the debris generated by the extrusion of the sealing element (such as a graphite gasket or a sealing element made of other material) or other impurities outside the connecting device can be well prevented from entering the first channel 111 and the second channel 121, and then entering the pipeline. This avoids the occurrence of blockage of the heat exchange system due to other substances entering the pipeline, which is beneficial to ensure the heat exchange performance of the heat exchange system.

Further, the inventors have obtained through a large number of experiments that when the first gap L1 is in a range of 0.05 mm to 0.25 mm, the first connecting member 11 and the second connecting member 12 are not easy to jam when disassembling and assembling. Thus, the first connecting member 11 and the second connecting member 12 are easy to disassemble.

It should be noted that the fixed connection between the first connecting member 11 and the second connecting member 12 in the present disclosure can be understood as the first connecting member 11 and the second connecting member 12 are fixed during assembling. In the illustrated embodiment of the present disclosure, the connection of the first connecting member 11 and the second connecting member 12 is detachable.

Further, in some embodiments, a second gap L2 is formed between the abutting portion 113 and the second side wall 1242. Through a large number of experiments, the inventors have found that when a range of the second gap L2 is 0.05 mm to 0.3 mm, it is more favorable for the disassembly and assembly of the first connecting member 11 and the second connecting member 12.

Optionally, in some embodiments, through a large number of experiments, the inventors have found that when the range of the first gap L1 is 0.1 mm to 0.25 mm, and the range of the second gap L2 is 0.1 mm to 0.3 mm, the pipe connection device 300 can well prevent other substances from entering the first channel 111 and the second channel 121, thereby ensuring the heat exchange performance of the heat exchange system. For example, the sealing member 13 (for example, a graphite gasket) will not be extruded from the first gap L1 and flow into the first channel 111 and the second channel 121. At the same time, the fit of the first connecting member 11 and the second connecting member 12 is loose, so that the problem of the first connecting member 11 and the second connecting member 12 being locked together will not occur, thereby facilitating the disassembly and assembly of the pipeline connection device 300.

Optionally, in some embodiments, when the range of the first gap L1 is 0.15 mm to 0.25 mm, and the range of the second gap L2 is 0.15 mm to 0.25 mm, the pipeline connection device 300 ensures that the sealing member 13 (for example, the graphite gasket) will not be extruded into the first gap L1 and flow into the first channel 111 and the second channel 121, thereby ensuring the heat exchange performance of the heat exchange system. At the same time, the fit of the first connecting member 11 and the second connecting member 12 is loose, which makes the disassembly and assembly of the first connecting member 11 and the second connecting member 12 easier.

Optionally, in some embodiments, when the range of the first gap L1 is 0.1 mm to 0.2 mm, and the range of the second gap L2 is 0.1 mm to 0.2 mm, the pipeline connection device 300 ensures that the sealing member 13 (for example, the graphite gasket) will not be extruded into the first gap L1 and flow into the first channel 111 and the second channel 121, thereby ensuring the heat exchange performance of the heat exchange system. At the same time, the fit of the first connecting member 11 and the second connecting member 12 is loose, which makes the disassembly and assembly of the first connecting member 11 and the second connecting member 12 easier.

Optionally, in some embodiments, when the range of the first gap L1 is 0.05 mm to 0.15 mm, and the range of the second gap L2 is 0.05 mm to 0.15 mm, the pipeline connection device 300 ensures that the sealing member 13 (for example, the graphite gasket) will not be extruded into the first gap L1 and flow into the first channel 111 and the second channel 121, and the disassembly and assembly of the first connecting member 11 and the second connecting member 12 are easier.

In addition, optionally, in some embodiments, when the range of the first gap L1 is 0.15 mm to 0.25 mm, and the range of the second gap L2 is 0.25 mm to 0.3 mm, there may be a small amount of the sealing element 13 (such as the graphite gasket) that will be extruded at the second gap L2, but no sealing element 13 (such as the graphite gasket) will be extruded at the first gap L1, which can well ensure the tightness of the pipeline connection device 300. At the same time, the fit of the first connecting member 11 and the second connecting member 12 is loose, and the first connecting member 11 and the second connecting member 12 are easy to disassemble and assemble.

Optionally, in some embodiments, when the range of the first gap L1 is 0.25 mm to 0.3 mm, and the range of the second gap L2 is 0.25 mm to 0.3 mm, a small amount of the sealing element 13 (such as the graphite gasket) may be extruded at both the first gap L1 and the second gap L2. However, the small amount of extruded debris of the sealing member 13 will not enter the first channel 111 and the second channel 121, so the performance of the heat exchange system will not be affected. In addition, when these ranges are selected for the first gap L1 and the second gap L2, the fit of the first connecting member 11 and the second connecting member 12 is loose, and the first connecting member 11 and the second connecting member 12 are easy to disassemble and assemble.

Optionally, in some embodiments, when the range of the first gap L1 is 0 to 0.1 mm and the range of the second gap L2 is 0 to 0.1 mm, no sealing member will be extruded at the first gap L1 and the second gap L2. Therefore, no debris or the like of the sealing member 13 will enter the first channel 111 and the second channel 121 at the first gap L1. Therefore, it is possible to avoid the occurrence of blockage of the heat exchange system due to other substances entering the pipeline, which is beneficial to ensure the heat exchange performance of the heat exchange system.

Further, referring to FIGS. 2 to 6, in some embodiments, the first connecting member 11 includes a second groove portion 114 located on an outer peripheral side of the abutting portion 113. The second groove portion 114 includes a second receiving groove 1140, an inner wall surface 1141 located inside the second receiving groove 1140, a bottom wall 1143 located at a bottom of the second receiving groove 1140, and an outer wall surface 1142 located outside the second receiving groove 1140. An outer wall surface of the abutting portion 113 is the inner wall surface 1141 of the second groove portion 114. Correspondingly, the second connecting member 12 includes a second isolation portion 125 located on an outer peripheral side of the first receiving groove 1240. The second isolation portion 125 includes an outer wall surface 1252 and an end surface 1251. The end surface 1251 of the second isolation portion 125 and the end surface 1231 of the first isolation portion 123 may be located on the same plane or not on the same plane. The end surface 1231 of the first isolation portion 123 is higher than the height of the sealing element 13, so that the sealing element 13 can be completely received in the first receiving groove 1240, and the sealing element 13 is prevented from being directly exposed in the second channel 121. An outer wall surface (i.e., the second side wall 1242) of the first groove portion 124 is an inner wall surface of the second isolation portion 125. At least part of the second isolation portion 125 is disposed in the second receiving groove 1140. The end surface 1251 of the second isolation portion 125 may abut against the bottom wall 1143 of the second groove portion 114 or may not be in contact with the bottom wall 1143 of the second groove portion 114. The present disclosure does not be limited to this, and can be set according to specific application environments.

Figure 4:
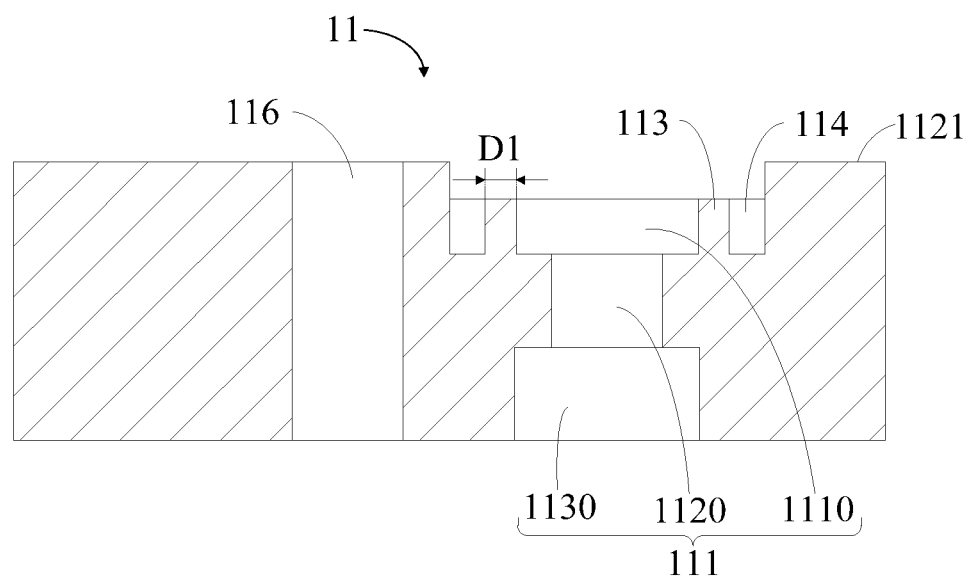
FIG. 4 is a cross-sectional view of the first connecting member shown in FIG. 3.
Figure 5:
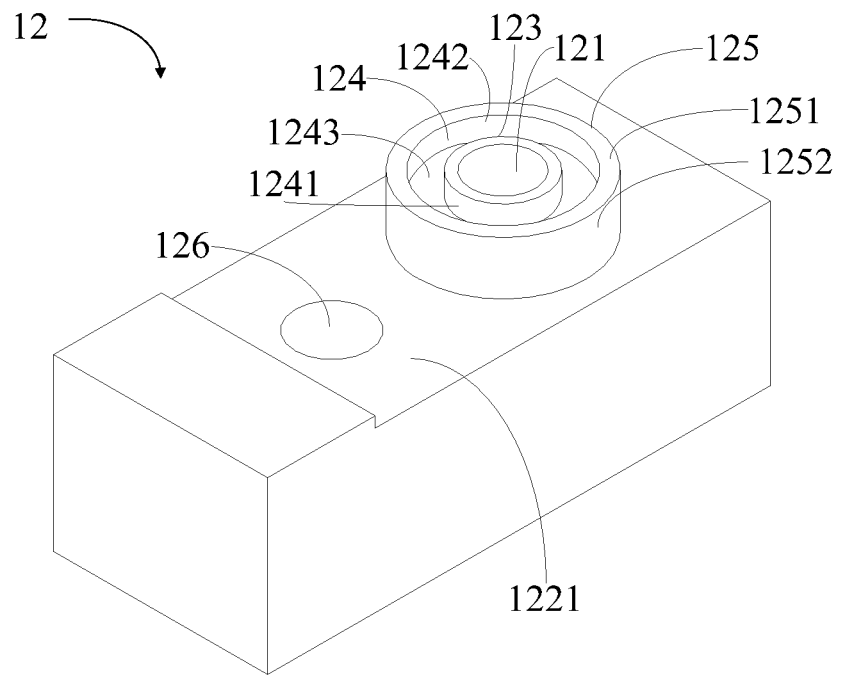
FIG. 5 is a schematic structural view of a second connecting member in FIG. 1 in an embodiment.
Figure 6:
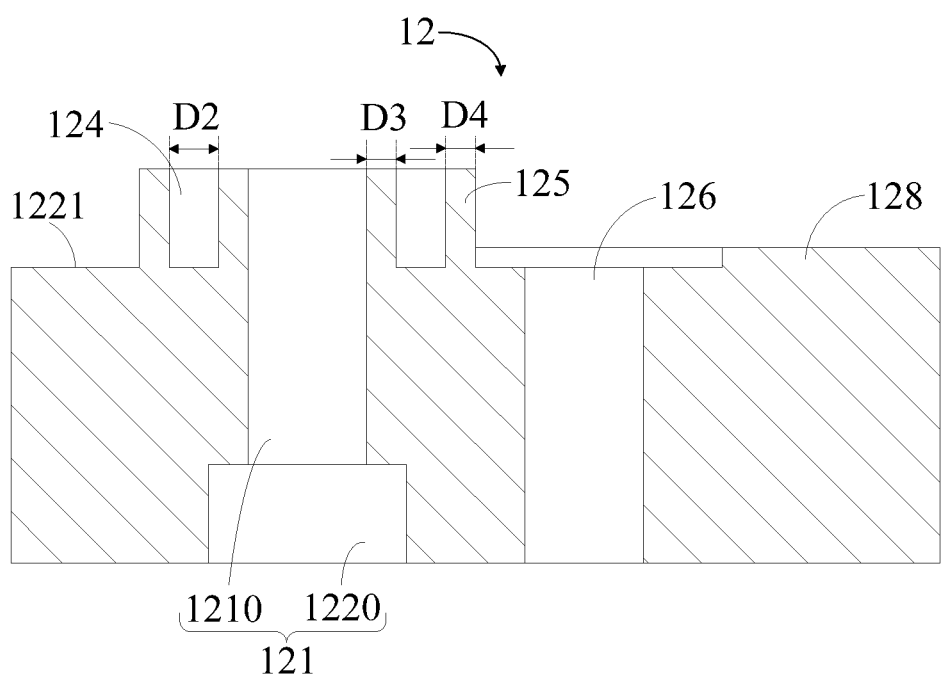
FIG. 6 is a cross-sectional view of the second connecting member shown in FIG. 5.

Further, the inventors have found through research that if the thickness of the abutting portion 113 is too small, the abutting area between the abutting portion 113 and the sealing member 13 will be reduced, resulting in a poor sealing effect. However, if the thickness of the abutting portion 113 is too large, the pre-tightening force of a mounting bolt will increase, which will increase the difficulty of sealing. Regarding the bolt, it will be described in detail in the following embodiment, and for details, please refer to the following related descriptions. Referring to FIGS. 4 and 6, in some embodiments, the inventors have obtained through a large number of experiments that when a thickness D1 of the abutting portion 113 is 1.5 mm to 3 mm, and a width D2 of the first receiving groove 1240 is 1.7 mm to 3.55 mm, the sealing performance of the pipeline connection device 300 can be well ensured, and it is also easy to install.

Further, referring to FIG. 6, in some embodiments, a thickness D3 of the first isolation portion 123 is 1 mm to 2.5 mm.

Referring to FIG. 6, in some embodiments, a thickness D4 of the second isolation portion 125 is 1 mm to 2.5 mm.

Further, referring to FIGS. 2 to 6, in some embodiments, the first channel 111 of the first connecting member 11 includes a channel main body 1120, a channel accommodating portion 1110 adjacent to the second connecting member 12 and a pipeline receiving portion 1130 away from the second connecting member 12. A radial dimension of the channel accommodating portion 1110 is greater than a radial dimension of the channel main body 1120. Correspondingly, a dimension of an outer diameter of the first isolation portion 123 is also larger than the radial dimension of the channel main body 1120, so that at least part of the first isolation portion 123 can be disposed in the channel accommodating portion 1110 of the first channel 111. The channel accommodating portion 1110 includes a bottom wall 1113, a side wall 1112 and an opening 1111. The abutting portion 113 has an abutting surface 1131 facing the second connecting member 12. The abutting surface 1131 is located on an outer peripheral side of the opening 1111 and can be located in the same plane as the opening 1111. The first isolation portion 123 includes an end surface 1231 facing the first connecting member 11. The end surface 1231 of the first isolation portion 123 may abut against the bottom wall 1113 of the channel accommodating portion 1110, or may not be in contact with the bottom wall 1113 of the channel accommodating portion 1110. A radial dimension of the pipeline receiving portion 1130 is also greater than the radial dimension of the channel main body 1120, so as to facilitate the installation and fixation of the pipeline in the pipeline receiving portion 1130.

The second channel 121 includes a channel main body 1210 adjacent to the first connecting member 11 and a pipe receiving portion 1220 away from the first connecting member 11. A radial dimension of the pipe receiving portion 1220 is larger than a radial dimension of the channel main body 1210 so as to facilitate the installation and fixation of another pipe in the pipe receiving portion 1220. The second channel 121 includes an opening 1211 adjacent to the first connecting member 11. The end surface 1231 of the first isolation portion 123 is located on an outer peripheral side of the opening 1211 and is located on the same plane as the opening 1211.

Further, referring to FIGS. 1 to 6, in some embodiments, the first connecting member 11 includes a first end surface 1121 facing the second connecting member 12. The second connecting member 12 includes a second end surface 1221 opposite to the first end surface 1121. The end surface of the abutting portion 113 is farther away from the second connecting member 12 relative to the first end surface 1121. The end surface of the first isolation portion 123 is closer to the first connecting member 11 relative to the second end surface 1121. That is, the abutting portion 113 is recessed in the first connecting member 11 and the first isolation portion 123 protrudes from the second connecting member 12.

Figure 7:
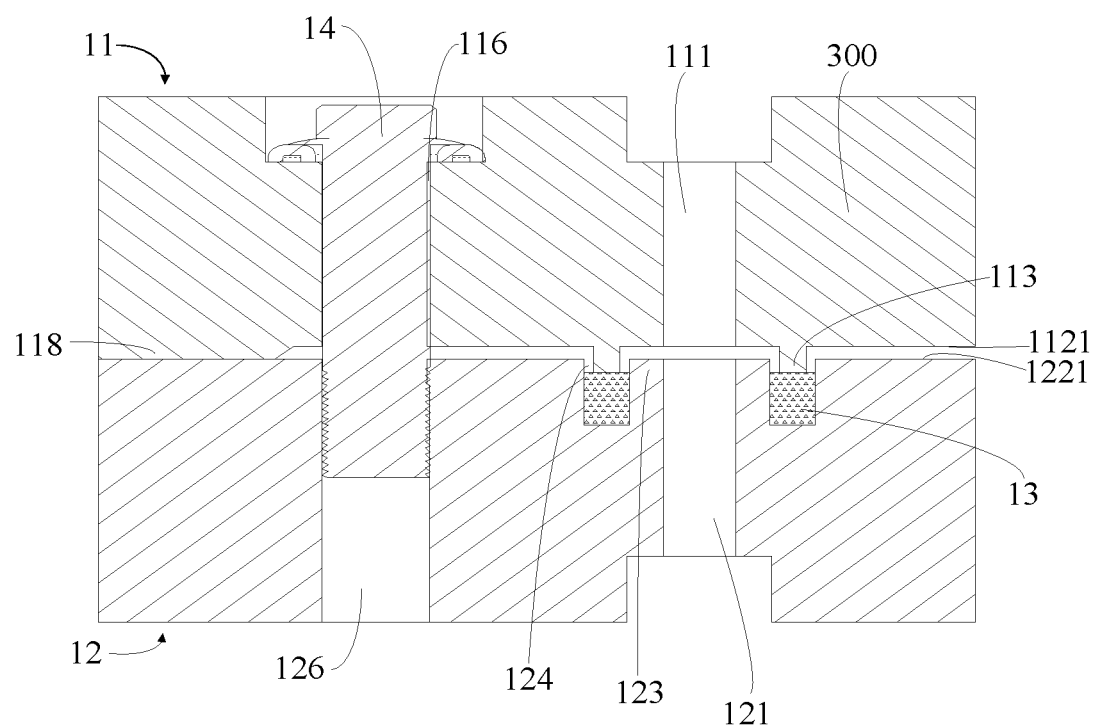
FIG. 7 is a cross-sectional view of the pipeline connection device in accordance with an exemplary embodiment of the present disclosure assembled in a second embodiment.

In other embodiments, referring to FIG. 7, the first connecting member 11 includes a first end surface 1121 facing the second connecting member 12. The second connecting member 12 includes a second end surface 1221 opposite to the first end surface 1121. The abutting portion 113 is provided protruding beyond the first end surface 1121. The first receiving groove 1240 is formed by a portion of the second connecting member 12 recessed inwardly from the second end surface 1221. That is, the abutting portion 113 protrudes from the first connecting member 11, and the first isolation portion 123 is recessed in the second connecting member 12.

Further, the first connecting member 11 includes a first through hole 116. The second connecting member 12 includes a second through hole 126 opposite to the first through hole 116.

Correspondingly, the pipeline connection device 300 includes a fastening device. In some embodiments, the fastening device includes a bolt and a nut. The bolt is capable of passing through the first through hole 116 and the second through hole 126, and the nut fastens the bolt. In other embodiments, the fastening device includes a bolt. The first through hole 116 is provided with an internal thread. The bolt extends from an end of the second through hole 126 away from the first through hole 116 through the second through hole 126 so as to extend into the first through hole 116, and mats with the internal thread of the first through hole 116 in order to realize the fastening of the first connecting member 11 and the second connecting member 12. Of course, an internal thread can also be provided on an inner wall of the second through hole 126 (as shown in FIG. 7). The bolt 14 extends from the end of the first through hole 116 away from the second through hole 126 through the first through hole 116 so as to extend into the second through hole 126, and mates with the internal thread of the second through hole 126 in order to realize the fastening of the first connecting member 11 and the second connecting member 12. The present disclosure does not limit this, which can be set according to specific application environments.

Further, at least one of the first connecting member 11 and the second connecting member 12 is provided with a stepped portion, so that a sealing surface on a side close to the bolt and a sealing surface on a side away from the bolt are subjected to the same pre-tightening force, thereby achieving uniform sealing of the pipeline connection device 300. Referring to FIGS. 2 to 6, in some embodiments, the second connecting member 12 is provided with a stepped portion 128 which is located on an opposite side of the second channel 121. That is, the second through hole 126 is provided between the step portion 128 and the second channel 121. In other embodiments, as shown in FIG. 7, the first connecting member 11 is provided with a step portion 118. The first through hole 116 is provided between the step portion 128 and the first channel 111.

Figure 9:
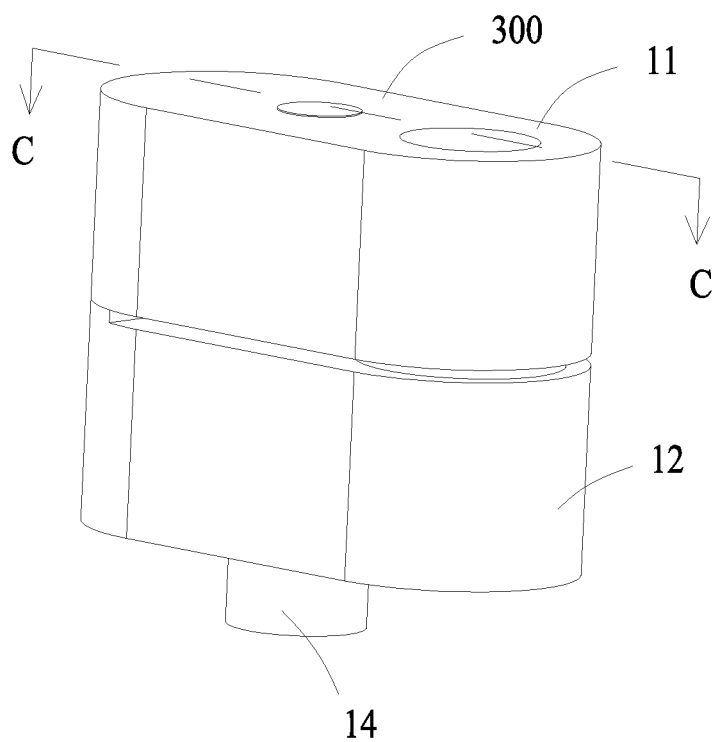
FIG. 9 is a perspective schematic view of the pipeline connection device in FIG. 8, in which the first connecting member and the second connecting member are relatively fixed and sealed.
Figure 10:
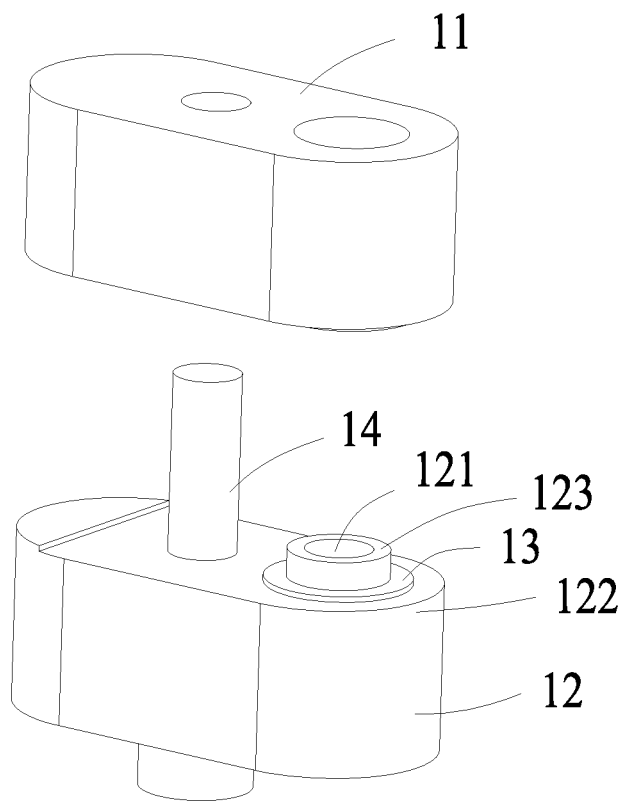
FIG. 10 is a partial perspective exploded schematic view of the pipeline connection device in FIG. 8.
Figure 11:
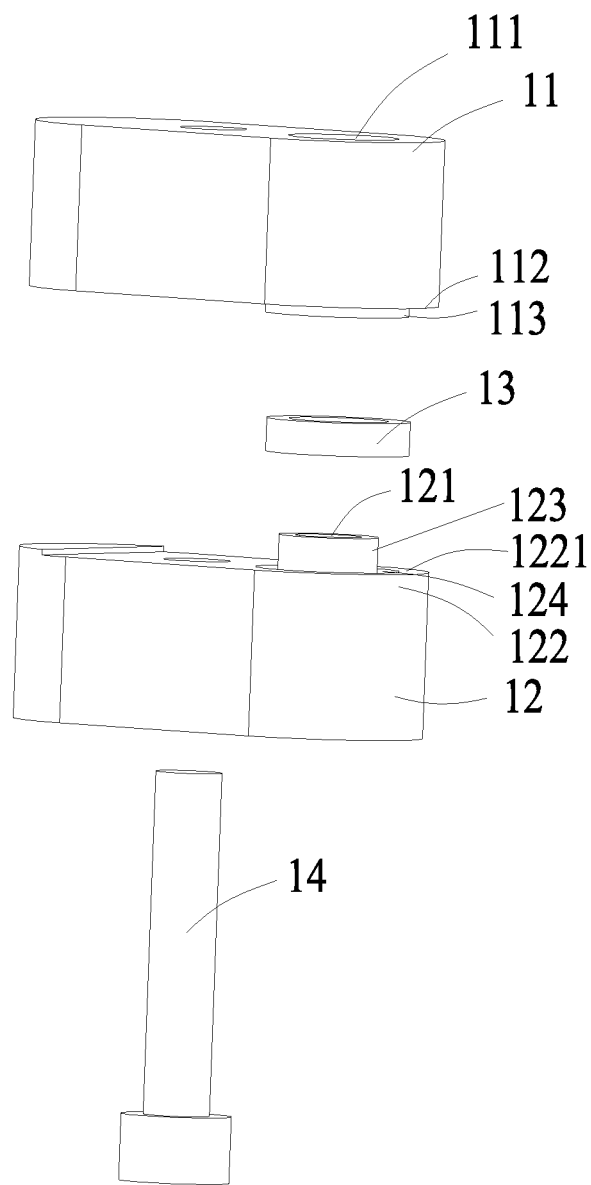
FIG. 11 is a further perspective exploded schematic view of the pipeline connection device in FIG. 10.
Figure 12:
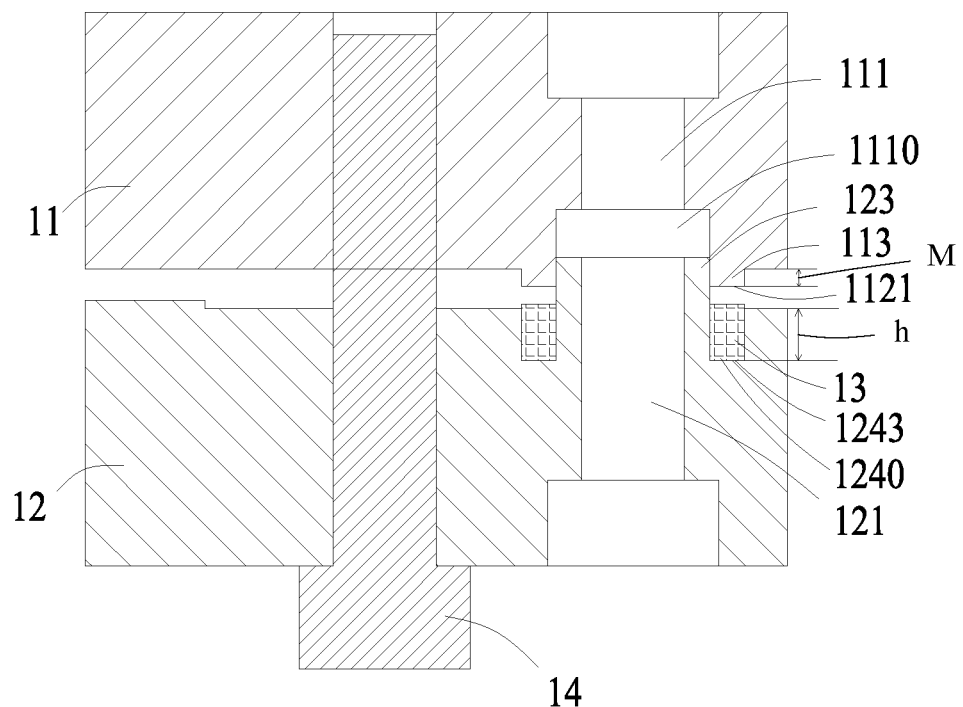
FIG. 12 is a schematic cross-sectional view taken axially along line B-B in FIG. 8.
Figure 13:
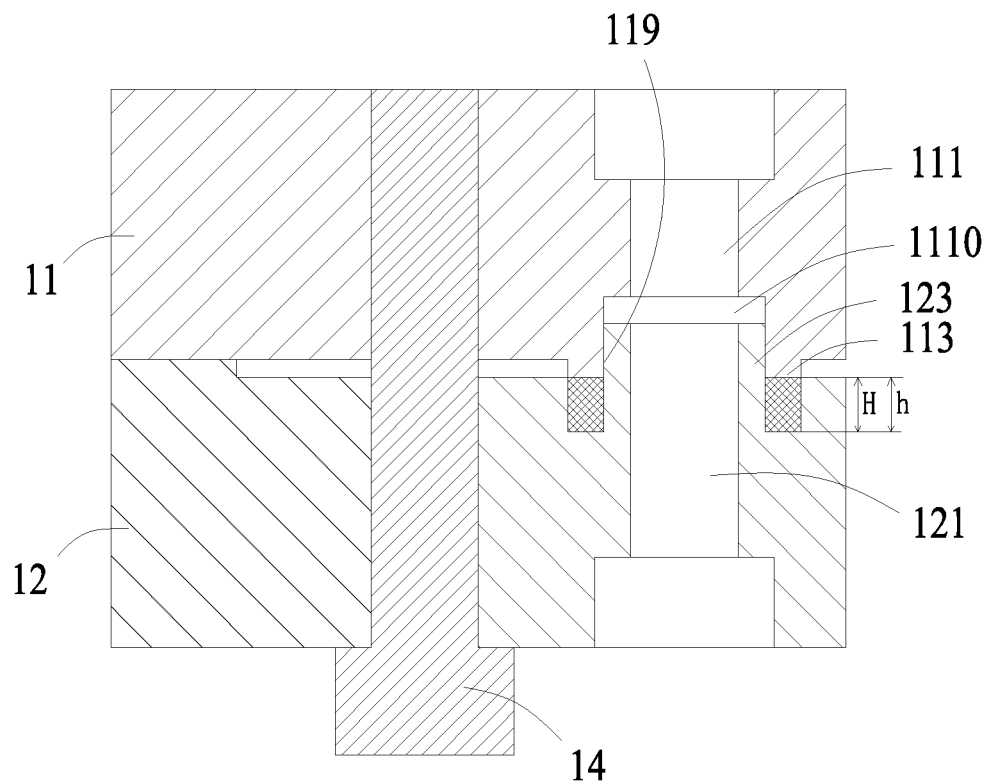
FIG. 13 is a schematic cross-sectional view taken axially along line C-C in FIG. 9, in which the sealing member is compressed to an axial height equal to a depth of the first receiving groove.

FIGS. 8 to 13 disclose a pipeline connection device 300 (referring to FIG. 9) according to a third embodiment of the present disclosure. The pipeline connection device 300 includes a first connecting member 11, a second connecting member 12, a sealing member 13, and a fastening device for relatively fixing the first connecting member 11 and the second connecting member 12. The sealing member 13 is a graphite gasket. Referring to FIGS. 11 to 13, in this embodiment, the fastening device is a bolt 14.

The second connecting member 12 includes a second end portion 122 facing the first connecting member 11, a first isolation portion 123 protruding outwardly from the second end portion 122 and extending beyond the second end portion 122, and a second channel 121 extending through the second connecting member 12 in an axial direction. The second channel 121 axially extends through the first isolation portion 123. The second connecting member 12 includes a first groove portion 124. The first groove portion 124 includes a first receiving groove 1240 recessed inwardly from the second end portion 122 and used for receiving the sealing member 13. The first receiving groove 1240 is ringed around an outer circumference of the first isolation portion 123. The first groove portion 124 includes a bottom wall 1243 located in the first receiving groove 1240. The first receiving groove 1240 axially extends through a second end surface 1221. The projection of the sealing element 13 in the axial direction overlaps with the projection of the second end surface 1221 in the axial direction, or the projection of the sealing element 13 in the axial direction falls into a plane where the second end surface 1221 is located. In this embodiment, the first groove portion 124 includes only one first receiving groove 1240.

Figure 8:
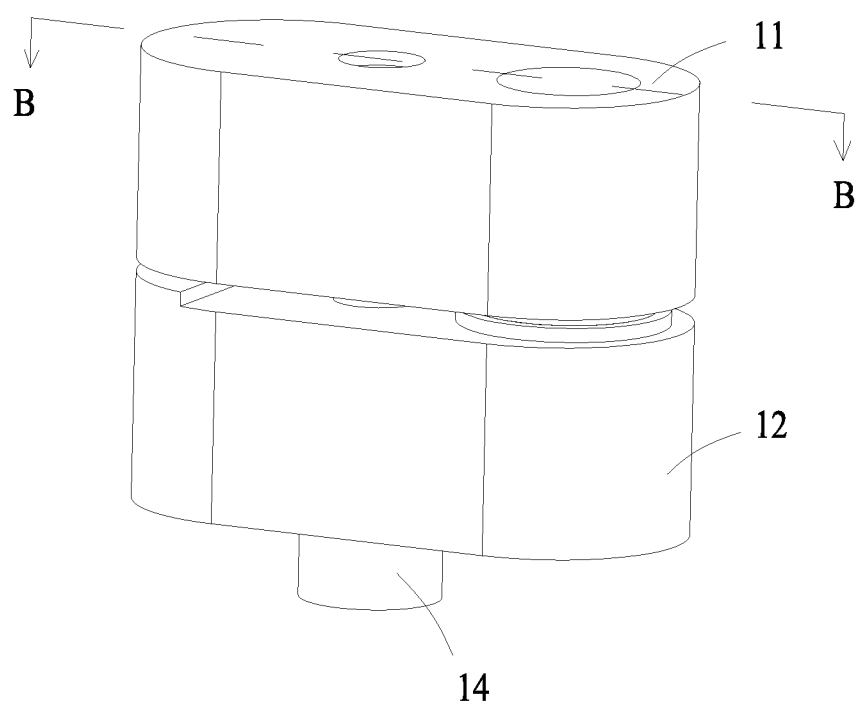
FIG. 8 is a perspective schematic view of the pipeline connection device in accordance with an exemplary embodiment of the present disclosure in a third embodiment, in which the first connecting member and the second connecting member are not relatively fixed.

Referring to FIGS. 8, 10 and 12, when the second connecting member 12 and the first connecting member 11 are in a free state, that is, not fixed by the fastening device, an original height of the sealing member 13 in the axial direction of the second channel 121 is higher than a depth h of the first receiving groove 1240. A radial depth of the first receiving groove 1240 in a radial direction of the second channel 121 is greater than or equal to a radial thickness of the sealing member 13.

The first connecting member 11 includes a first end portion 112 for mating with the second end portion 122, an abutting portion 113 protruding outwardly from the first end portion 112, a channel accommodating portion 1110 for receiving the first isolation portion 123, and a first channel 111 axially extending through the first connecting member 11. The first channel 111 is in communication with the channel accommodating portion 1110 in the axial direction. In this embodiment, the first end portion 112 includes only one abutting portion 113. Optionally, an inner diameter of the first channel 111 and an inner diameter of the second channel 121 are substantially equal. A radial outer diameter of the first isolation portion 123 is equal to or smaller than a radial inner diameter of the channel accommodating portion 1110. With this arrangement, the connecting and sealing between the second connecting member 12 and the first connecting member 11 can be better achieved.

The abutting portion 113 is disposed around an outer circumference of the channel accommodating portion 1110. A cross-sectional shape of the abutting portion 113 is consistent with a cross-sectional shape of the sealing member 13. In other words, a shape of an end where the abutting portion 113 contacts the sealing member 13 matches a shape of an end where the sealing member 13 contacts the abutting portion 113. The sealing member 13 abuts between the bottom wall 1243 and the first end surface 1121. This arrangement can ensure that the abutting portion 113 stably presses against the sealing element 13 received in the first receiving groove 1240, and ensures that the sealing element 13 is compressed to be fully received in the first receiving groove 1240, thereby avoiding the hidden dangers caused by the graphite gasket being crushed and falling out. In the present embodiment, the second connecting member 12 and the first connecting member 11 are fixed by only one abutting portion 113 and one first receiving groove 1240 locked with each other. This reduces the mating surface between the second connecting member 12 and the first connecting member 11, and improves the problem that the second connecting member 12 and the first connecting member 11 jam.

Figure 14:
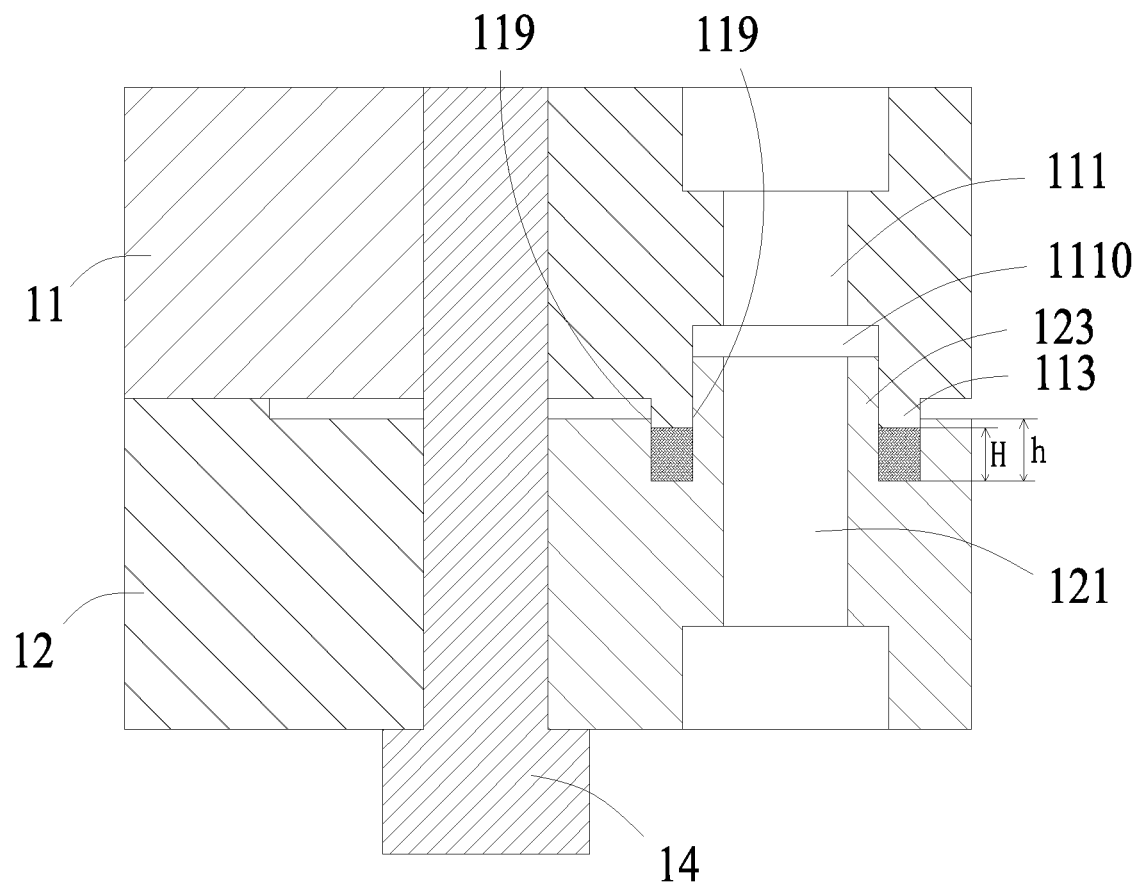
FIG. 14 is a schematic cross-sectional view of the pipeline connection device in accordance with an exemplary embodiment of the present disclosure in a fourth embodiment, in which the sealing member is compressed to an axial height smaller than a depth of the first receiving groove.

Referring to FIGS. 9, 13 and 14, when the second connecting member 12 and the first connecting member 11 are fixed and sealed by the fastening device (such as the bolt 14), the first channel 111 and the second channel 121 are in direct communication. The sealing member 13 is pressed by the abutting portion 113 in the axial direction. A height H of the sealing member 13 is equal to the depth h of the first receiving groove 1240. Referring to FIGS. 13 and 14, in some embodiments of the present disclosure, the first receiving groove 1240 is formed by a main body of the second connecting member 12. Optionally, the sealing member 13 after being compressed is a graphite gasket with a density greater than 1.8 g/cm$^3$. Of course, referring to FIG. 14, in a fourth embodiment of the pipeline connection device of the present disclosure, the sealing member 13 can also be further compressed by the abutting portion 113 until the height H of the sealing member 13 is slightly smaller than the depth h of the first receiving groove 1240. Optionally, a ratio of the height H of the sealing member 13 to the depth h of the first receiving groove 1240 is X, wherein $0.6 \leq X \leq 1$. The sum of the height M of the abutting portion 113 extending in the axial direction and the height H of the sealing member 13 is greater than the depth h of the first receiving groove 1240. The sum of the height M of the abutting portion 113 and the height H of the sealing member 13 is less than or equal to the sum of the height M of the abutting portion 113 and the depth h of the first receiving groove 1240.

In this embodiment, the graphite gasket with a density of 1.4 g/cm$^3$ to 1.6 g/cm$^3$ and an original height is provided, and the graphite gasket is installed in the first receiving groove 1240. At this time, the original height of the graphite gasket in the axial direction is higher than the axial depth h of the first receiving groove 1240 (refer to FIGS. 8 and 12). The graphite gasket is pressed downwardly in the axial direction by the abutting portion 113, so that the graphite gasket after being pressed becomes the sealing member 13 received in the first receiving groove 1240. At this time, the height H of the sealing member 13 is equal to or slightly smaller than the depth h of the first receiving groove 1240. In both cases, the relative sealing between the second connecting member 12 and the first connecting member 11 can be achieved.

When the original graphite gasket with the density between 1.4 g/cm$^3$ to 1.6 g/cm$^3$ is compressed into the graphite gasket with a density greater than 1.8 g/cm$^3$, the sealing member 13 at this time can achieve a better sealing effect between the second connecting member 12 and the first connecting member 11. At the same time, because only the abutting portion 113 and the first receiving groove 1240 and the first isolation portion 123 abut and match each other, only two mating surfaces are generated. Therefore, the hidden danger of assembly and disassembly of the second connecting member 12 and the first connecting member 11 due to a large number of mating surfaces is reduced.

Of course, in other embodiments, the original height of the graphite gasket may also be slightly less than or equal to the depth h of the first receiving groove 1240. According to the density of the graphite gasket, the sealing effect between the second connecting member 12 and the first connecting member 11 can be achieved by pressing the graphite gasket through the abutting portion 113.

Figure 15:
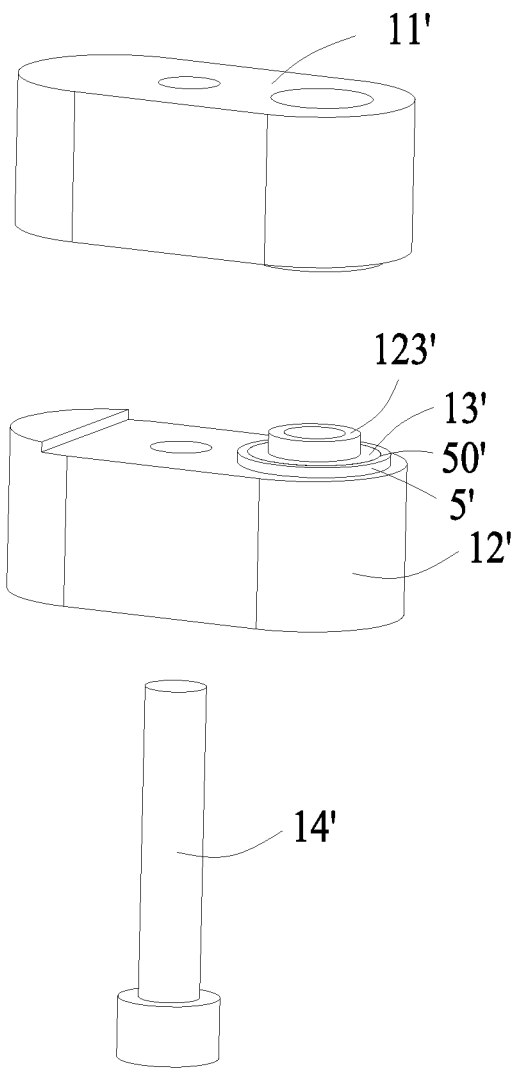
FIG. 15 is a partial perspective exploded schematic view of the pipeline connection device in accordance with an exemplary embodiment of the present disclosure in a fifth embodiment.
Figure 16:
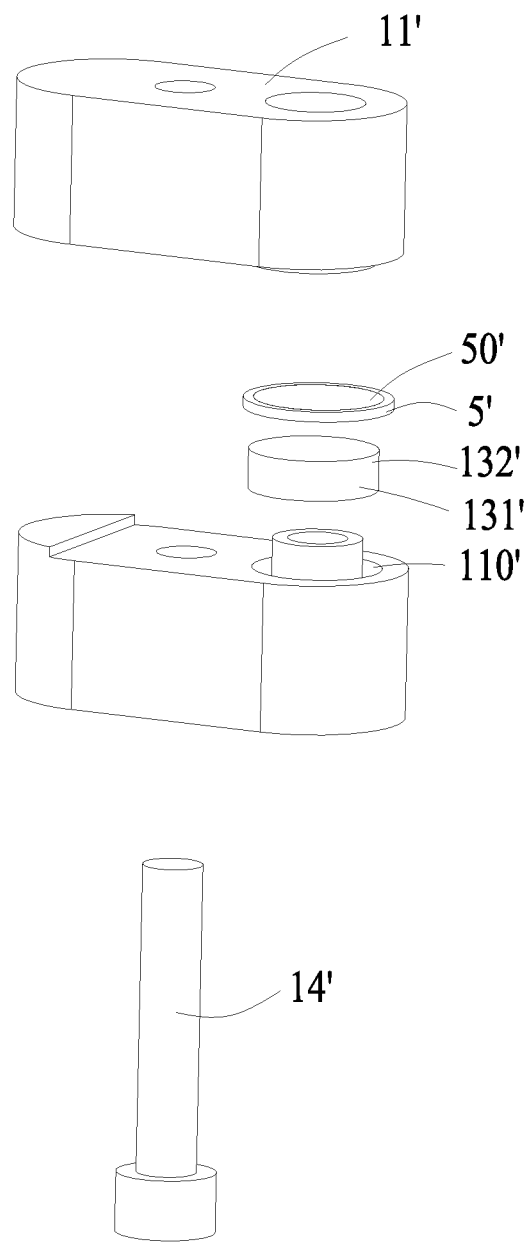
FIG. 16 is a further perspective exploded schematic view of the pipeline connection device in FIG. 15.
Figure 17:
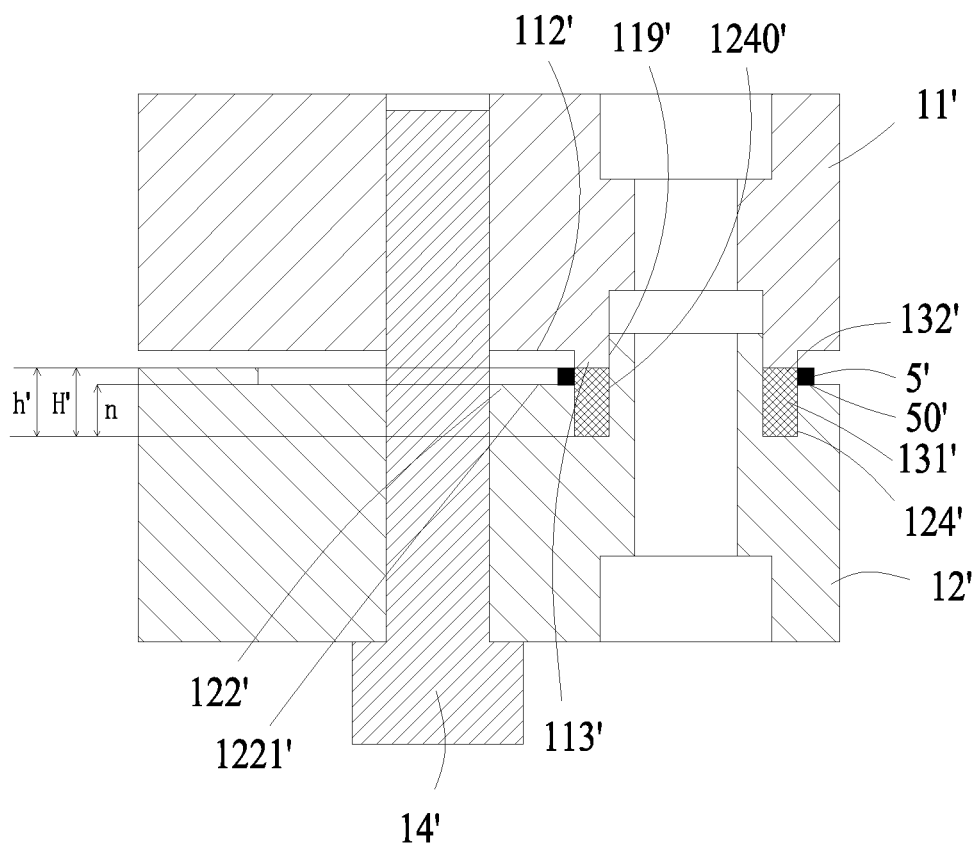
FIG. 17 is a schematic cross-sectional view of the pipeline connection device of the fifth embodiment, in which the first connecting member and the second connecting member are not relatively fixed.
Figure 18:
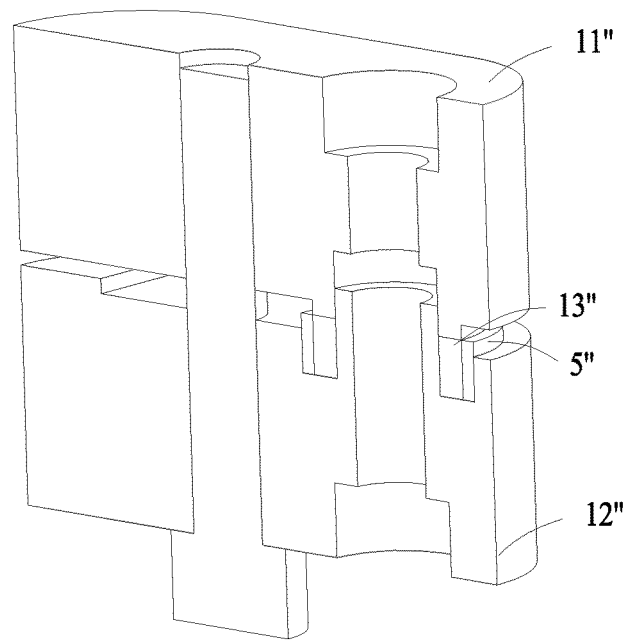
FIG. 18 is a schematic perspective cross-sectional view of the pipeline connection device in accordance with an exemplary embodiment of the present disclosure in a sixth embodiment, in which a cross-sectional line is omitted.
Figure 19:
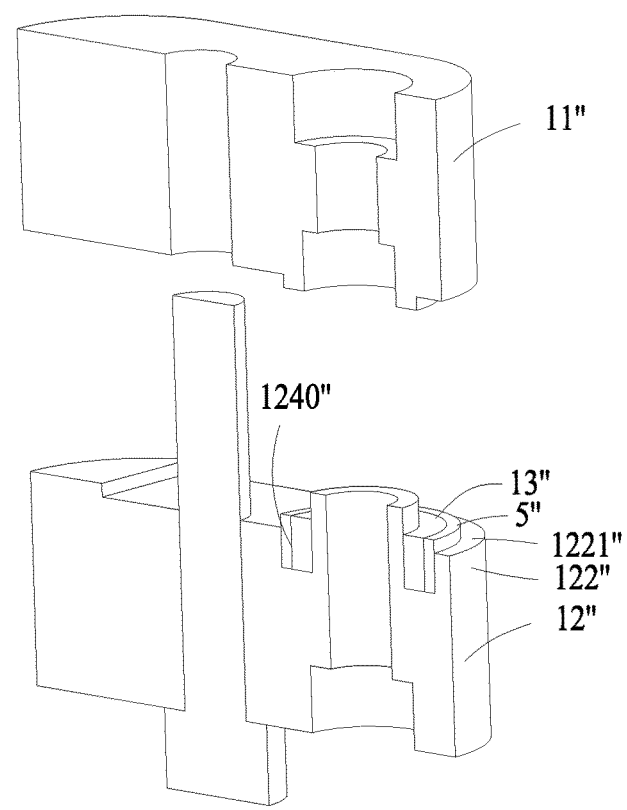
FIG. 19 is a partial exploded schematic view of the pipeline connection device in FIG. 18.
Figure 20:
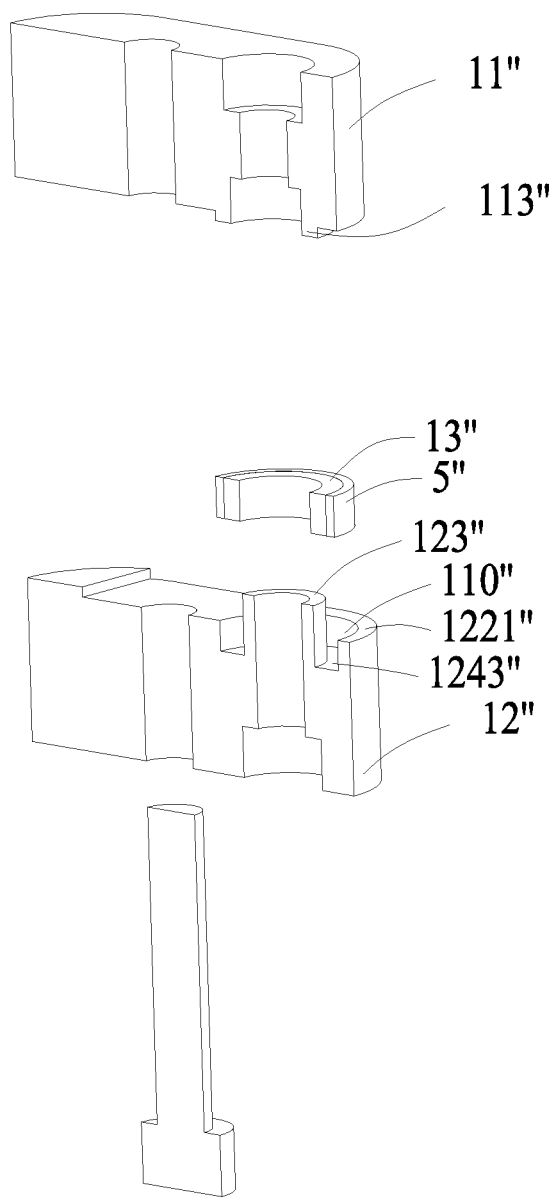
FIG. 20 is a further exploded schematic view of the pipeline connection device in FIG. 19.
Figure 21:
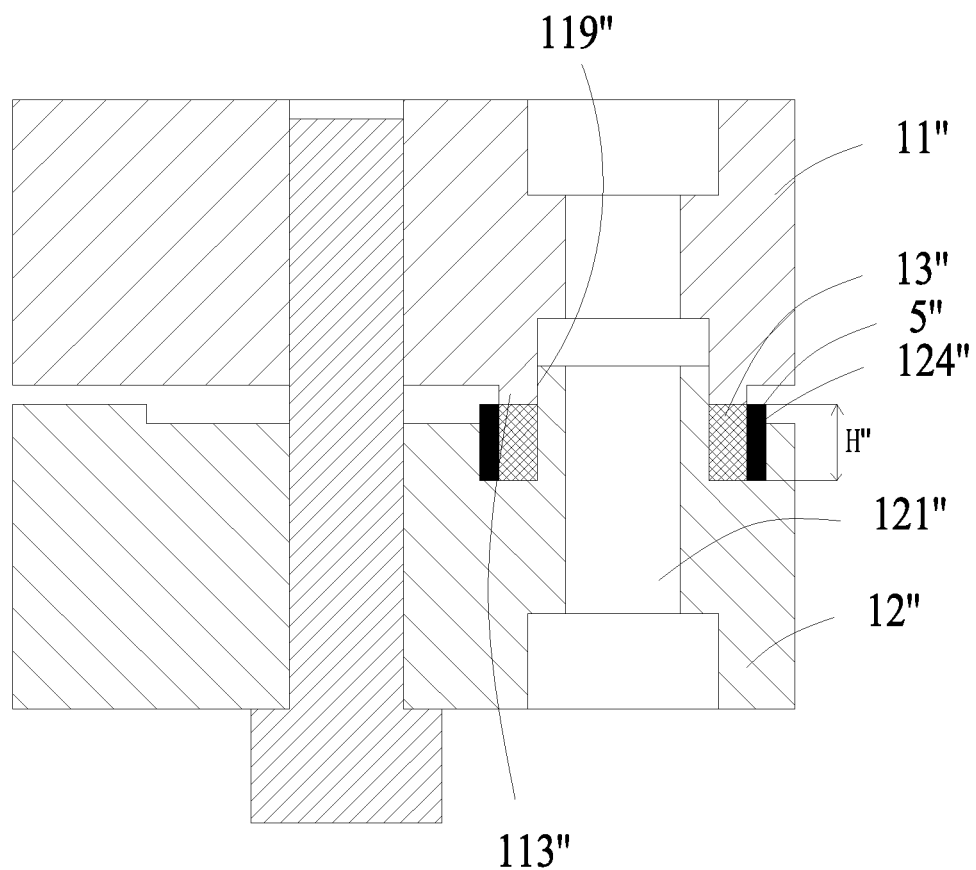
FIG. 21 is a schematic cross-sectional view of the pipeline connection device in FIG. 18, in which the first connecting member and the second connecting member are not relatively fixed.

FIGS. 15 to 17 disclose a pipeline connection device of a fifth embodiment of the present disclosure. The pipeline connection device in this embodiment is mostly the same in structure as the pipeline connection device 300 in the third embodiment, so common features will not be repeated here. The main differences between the pipeline connection device of this embodiment and the third embodiment are that the second end portion 122' of the second connecting member 12' includes a second end surface 1221' disposed toward the first connecting member 11', a main body groove 110' recessed at the second end portion 122', a first isolation portion 123' protruding and extending from part of the bottom wall of the main body groove 110', a ring member 5' supported by the second end surface 1221', and a receiving space 50' formed between the ring member 5' and the first isolation portion 123'. The receiving space 50' is axially communicated with the main body groove 110' so as to form a first receiving groove 1240' for receiving the sealing member 13'. That is, the first receiving groove 1240' is jointly formed by the main body of the second connecting member 12' and the receiving space 50' between the ring member 5' and the first isolation portion 123'. Referring to FIG. 17, a height of the sealing member 13' is H'. A depth of the first receiving groove 1240' is h'. A depth of the main body groove 110' is n. A height H' of the sealing member is equal to the depth h' of the first receiving groove 1240'. The sealing member 13' is defined as a first portion 131' received in the main body groove 110' and a second portion 132' received in the receiving space 50'. A height of the ring member 5' in the axial direction is not less than the difference between the height H' of the sealing member 13' and the depth n of the main body groove 110'. An inner diameter of the ring member 5' is not less than an outer diameter of the main body groove 110'. In one embodiment, the ring member 5' is a metal ring. The projections of the main body groove 110' in the axial direction all fall within the projections of the ring member 5' in the axial direction. The abutting portion 113' on the first connecting member 11' presses the sealing member 13' downwardly in the axial direction. The ring member 5' is sleeved on a protruding portion of the sealing member 13' protruding from the main body groove 110'. That is, the ring member 5' is sleeved on the outside of the second portion 132'. With this arrangement, on the basis of the third embodiment, the pipeline connection device is further optimized. When the second connecting member 12' and the first connecting member 11' are slowly achieving a fixed seal through the bolt 14', the ring member 5' can reduce the risk of the sealing member 13' being extruded. Thereby, the hidden danger of the graphite gasket as the sealing member 13' being crushed and falling out of residues is further reduced. In this embodiment, the second end portion 122' is provided with only one first receiving groove 1240', the first end portion 112' is provided with only one abutting portion 113', and the second connecting member 12' and the first connecting member 11' are fixed by only one abutting portion 113' and one first receiving groove 1240' in a snap-fitting engagement. This reduces the mating surfaces between the second connecting member 12' and the first connecting member 11', and improves the problem of jamming of the second connecting member 12' and the first connecting member 11'.

FIGS. 18 to 21 disclose a pipeline connection device of a sixth embodiment of the present disclosure. The pipeline connection device in this embodiment is mostly the same in structure as the pipeline connection device 300 in the third embodiment, so common features will not be repeated here. The main differences between the pipeline connection device of this embodiment and the third embodiment are that the second end portion 122" of the second connecting member 12" includes a second end surface 1221" disposed toward the first connecting member 11", a main body groove 110" recessed at the second end portion 122", a first isolation portion 123" protruding from part of the bottom wall 1243" of the main body groove 110", and a ring member 5" at least partially received in the main body groove 110". A first receiving groove 1240" for receiving the sealing member 13" is formed between the ring member 5", the first isolation portion 123", and part of the bottom wall 1243" of the main body groove 110". The height of the ring member 5" in the axial direction is not lower than the height H" of the sealing member 13". The outer diameter of the ring member 5" is not greater than the outer diameter of the first receiving groove 1240". The radial depth of the main body groove 110" along the second channel 121" is greater than or equal to the sum of the radial thickness of the ring member 5" and the radial thickness of the sealing member 13". The projections of the ring member 5" in the axial direction all fall within the projections of the main body groove 110" in the axial direction. The abutting portion 113" on the first connecting member 11" presses the sealing member 13" downwardly in the axial direction. The ring member 5" is sleeved on the outside of the sealing member 13", and the ring member 5" is at least partially located in the first receiving groove 1240". With this arrangement, at least part of the sealing element 13" and at least part of the ring member 5" can be received in the main body groove 110". The arrangement of the ring member 5" not only reduces the hidden danger of jamming of the second connecting member 12" and the first connecting member 11", but also reduces the risk of the graphite gasket being crushed and falling out. In this embodiment, the second end portion 122" is provided with only one first receiving groove 1240", the first end portion 112" is provided with only one abutting portion 113", and the second connecting member 12" and the first connecting member 11" are fixed by only one abutting portion 113" and one first receiving groove 1240" in a snap-fitting engagement. This reduces the mating surface between the second connecting member 12" and the first connecting member 11", and improves the problem of jamming of the second connecting member 12" and the first connecting member 11".

Figure 22:
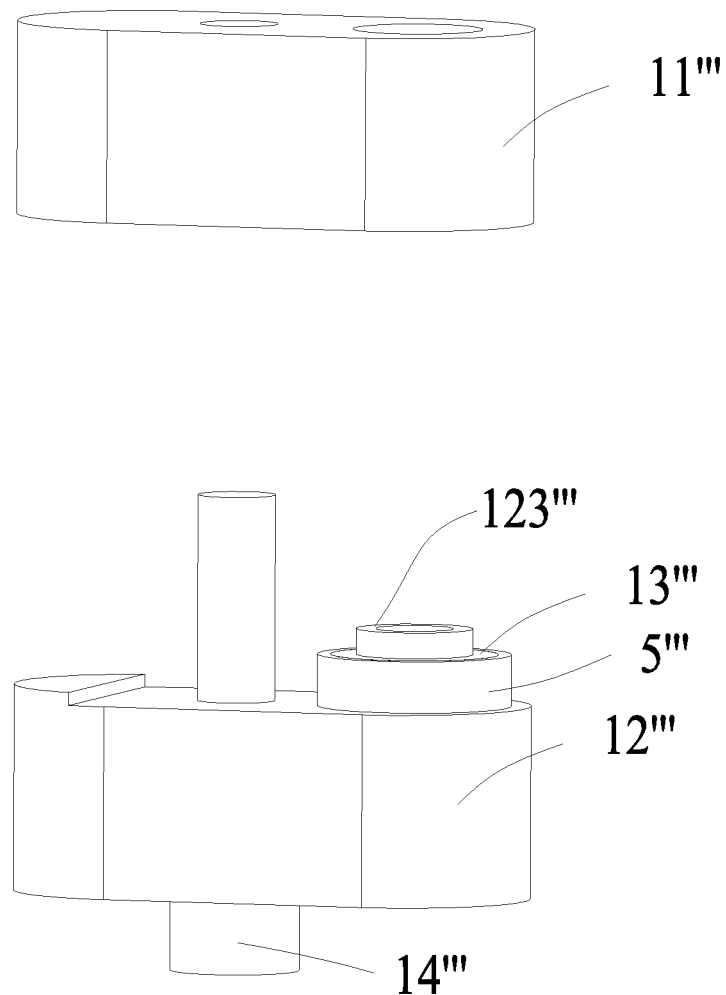
FIG. 22 is a partial perspective exploded schematic view of the pipeline connection device in accordance with an exemplary embodiment of the present disclosure in a seventh embodiment.
Figure 23:
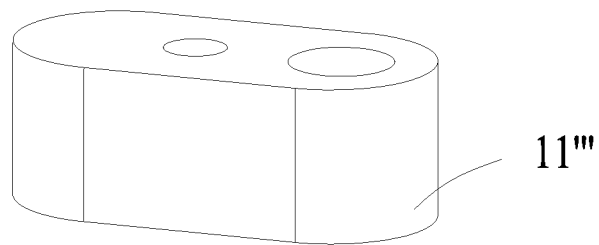
FIG. 23 is a further perspective exploded schematic view of FIG. 22.
Figure 23:
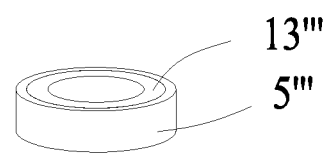
Figure 23:
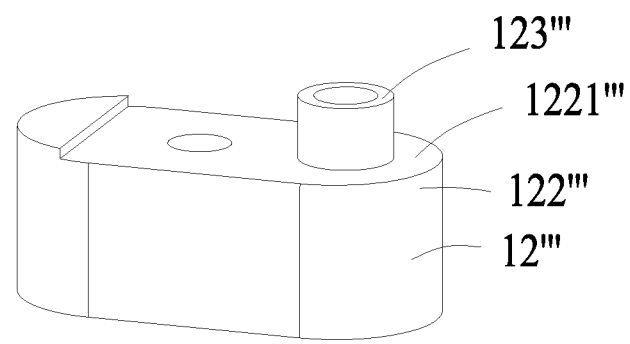
Figure 23:
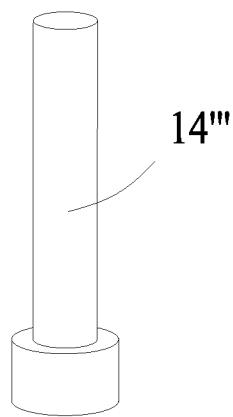
Figure 24:
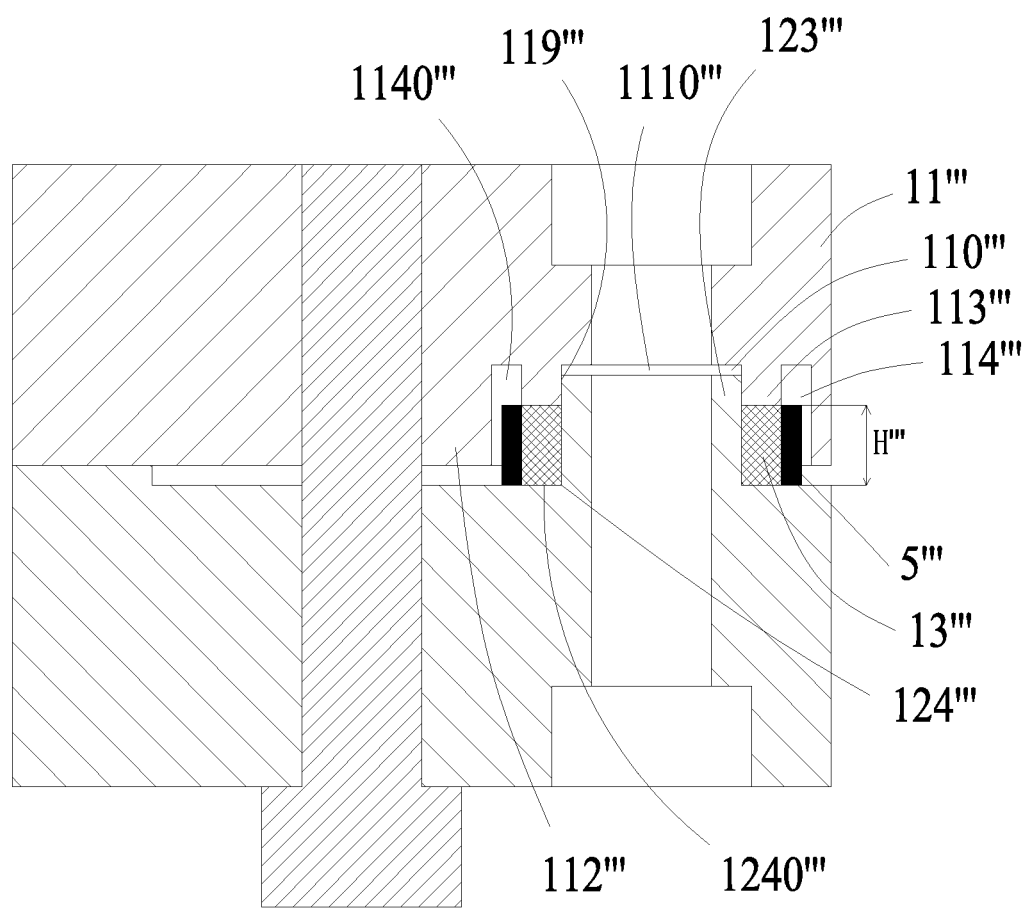
FIG. 24 is a schematic cross-sectional view of the pipeline connection device of the seventh embodiment of the present disclosure.
Figure 25:
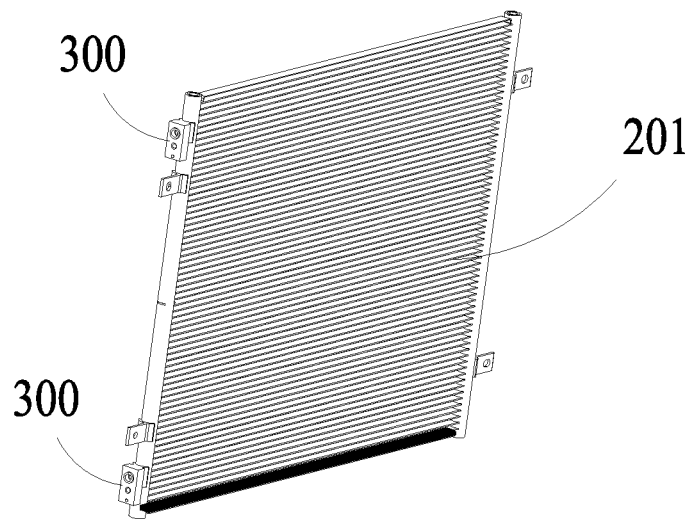
FIG. 25 is a perspective schematic view of a first type of pipeline adapting assembly of the present disclosure, in which the pipeline connection device is connected to a heat exchanger.
Figure 26:
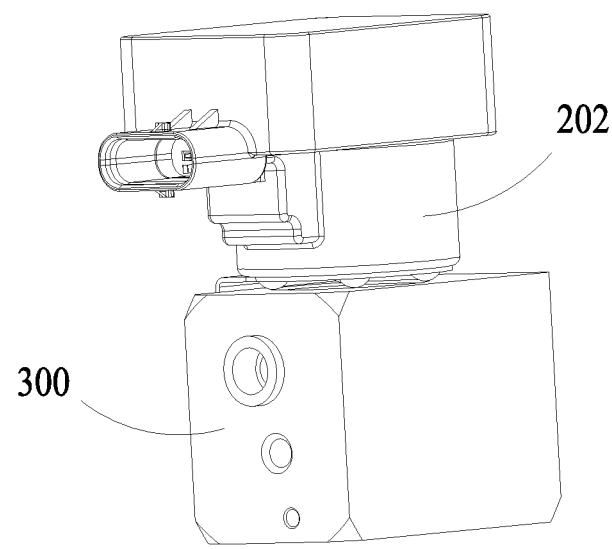
FIG. 26 is a perspective schematic view of a second type of pipeline adapting assembly of the present disclosure, in which the pipeline connection device is connected with a flow regulating device.
Figure 27:
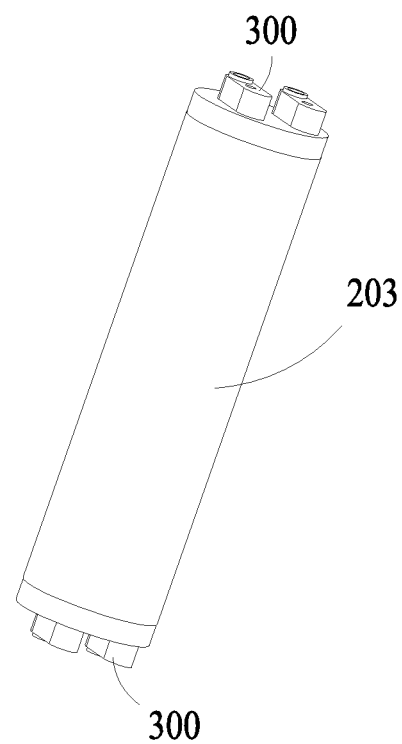
FIG. 27 is a perspective schematic view of a third type of pipeline adapting assembly of the present disclosure, in which the pipeline connection device is connected to a gas-liquid separator.
Figure 28:
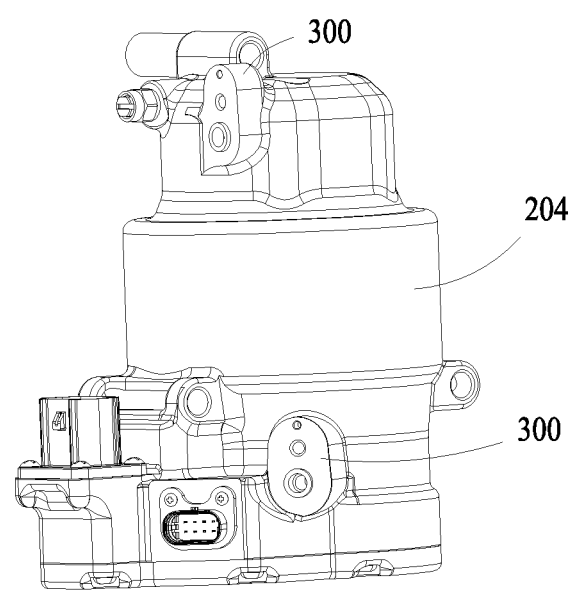
FIG. 28 is a perspective schematic view of a fourth type of pipeline adapting assembly of the present disclosure, in which the pipeline connection device is connected to a compressor.

FIGS. 22 to 24 disclose a pipeline connection device of a seventh embodiment of the present disclosure. The pipeline connection device in this embodiment is mostly the same in structure as the pipeline connection device in the third embodiment, and the main difference is a mating connection of the second connecting member 12''' and the first connecting member 11'''. In this embodiment, the pipeline connection device includes a sealing member 13''', a fastening device (for example, a bolt 14''') that relatively fixes the second connecting member 12''' and the first connecting member 11''', and a ring member 5''' sleeved on the outer periphery of the sealing member 13'''.

The second connecting member 12''' includes a second end portion 122''' and a first isolation portion 123''' protruding outwardly from the second end portion 122'''. The second connecting member 12''' includes a second end surface 1221''' disposed toward the first connecting member 11'''. The ring member 5''', the first isolation portion 123''' and part of the second end surface 1221''' together form a first receiving groove 1240''' for receiving the sealing member 13'''. The sealing member 13''' is sleeved on the first isolation portion 123'''. The ring member 5''' is sleeved on the outer periphery of the first isolation portion 123'''. The height of the ring member 5''' in the axial direction is not lower than the height H''' of the sealing member 13'''.

The first connecting member 11''' includes a first end portion 112''' mating with the second end portion 122''', a channel accommodating portion 1110''' recessed inwardly from the first end portion 112''', a second receiving groove 1140''', and an abutting portion 113''' protruding axially to separate the channel accommodating portion 1110''' from the second receiving groove 1140'''. When the second connecting member 12''' and the first connecting member 11''' are not relatively fixed, the height H''' of the sealing member 13''' in the axial direction is equal to the height of the ring member 5'. In other embodiments, the height H''' of the sealing member 13''' in the axial direction may also be greater or smaller than the height of the ring member 5'. Optionally, at this time, the sealing member 13 is a graphite gasket with a density between 1.4 g/cm$^3$ to 1.6 g/cm$^3$.

When the second connecting member 12''' and the first connecting member 11''' are fixed by the bolt 14''' and achieve sealing, the abutting portion 113''' presses the sealing member 13''', and the height of the sealing member 13''' in the axial direction is equal to the height of the ring member 5'''. Optionally, at this time, the sealing member 13''' is a graphite gasket with a density greater than 1.8 g/cm$^3$. Of course, in other embodiments, the abutting portion 113" may further press the sealing member 13''' until the height of the sealing member 13''' in the axial direction is smaller than the height of the ring member 5'''. The upper end of the ring member 5''' is received in the second receiving groove 1140'''.

Referring to FIGS. 2 and 8 to 28, the first connecting member 11, 11', 11", 11''' and the second connecting member 12, 12', 12", 12''' are provided with annular friction surfaces 119, 119', 119", 119''' which are in contact with each other. The number of annular friction surfaces 119, 119', 119", 119' does not exceed two. In the specific embodiments of the present disclosure, the annular friction surfaces 119, 119', 119", 119''' are annular vertical surfaces. It should be noted that, in other embodiments of the present disclosure, the annular friction surfaces 119, 119', 119", 119''' may also have other shapes such as tapered surfaces. In any case, the annular friction surfaces 119, 119', 119", 119''' need to extend a certain distance in an assembling direction in which the first connecting member 11, 11', 11", 11''' and the second connecting member 12, 12', 12", 12''' are assembled with each other. That is, the annular friction surfaces 119, 119', 119", 119''' are not bonding surfaces where the first connecting member 11, 11', 11", 11''' and the second connecting member 12, 12', 12", 12'" are attached to each other (the bonding surfaces are horizontal planes in the embodiment illustrated in the present disclosure).

In all the above embodiments, the height difference of the sealing member 13, 13', 13", 13'" due to compression and deformation ranges from 0.15 to 0.45 times the original height. This arrangement can ensure that when the sealing member 13, 13', 13", 13" achieves the best sealing effect, it is ensured that the second connecting member 12, 12', 12", 12'" and the first connecting member 11, 11', 11", 11" will not jam each other.

An embodiment of the present disclosure also provides a pipeline adapting assembly. The pipeline adapting assembly includes one of a heat exchanger 201, a flow regulating device 202, a gas-liquid separator 203 and a compressor 204, and the pipeline connection device 300 in any of the foregoing embodiments. The heat exchanger 201 is connected to the pipeline connection device 300, and at least one of an inlet and out outlet of the heat exchanger 201 is in communication with the first channel 111 or the second channel 121. Or, the flow regulating device 202 is connected to the pipeline connection device 300, and at least one of an inlet and an outlet of the flow regulating device 202 is in communication with the first channel 111 or the second channel 121. Or, the gas-liquid separator 203 is connected to the pipeline connection device 300, and at least one of an inlet and an outlet of the gas-liquid separator 203 is in communication with the first channel 111 or the second channel 121. Or, the compressor 204 is connected to the pipeline connection device 300, and at least one of an inlet and an outlet of the compressor 204 is in communication with the first channel 111 or the second channel 121. By using the pipe connection device 300, good circulation of the refrigerant in one of the heat exchanger 201, the flow regulating device 202, the gas-liquid separator 203 and the compressor 204 can be realized. It can be understood that the connection between the pipe connection device 300 and one of the heat exchanger 201, the flow regulating device 202, the gas-liquid separator 203 and the compressor 204 may be directly connected to the pipe connection device 300 or may be connected to the pipeline connection device 300 through pipelines, which is not limited by the present disclosure.

The above descriptions are only preferred embodiments of the present disclosure, and do not limit the present disclosure in any form. Although the present disclosure has been disclosed as above in preferred embodiments, it is not intended to limit the present disclosure. Those of ordinary skill in the art, without departing from the scope of the technical solutions of the present disclosure, can use the technical content disclosed above to make some changes or modifications into equivalent embodiments with equivalent changes. However, without departing from the content of the technical solutions of the present disclosure, any simple modifications, equivalent changes and modifications made to the above embodiments based on the technical essence of the present disclosure still fall within the scope of the technical solutions of the present disclosure.

What is claimed is:

1. A pipeline connection device, comprising: a first connecting member, a second connecting member and a sealing member, the first connecting member and the second connecting member being fixedly connected, the first connecting member comprising a first channel and an abutting portion provided on an outer peripheral side of the first channel, the second connecting member comprising a second channel and a first groove portion provided on an outer peripheral side of the second channel, the first groove portion comprising a first receiving groove and a first side wall adjacent to the second channel;

the sealing member being received in the first receiving groove, at least part of the abutting portion being received in the first receiving groove and abutting against the sealing element;

wherein a first gap is provided between the abutting portion and the first side wall, and the first gap is not greater than 0.3 mm;

wherein the first connecting member comprises a second groove portion located on an outer peripheral side of the abutting portion, an outer wall surface of the abutting portion is an inner wall surface of the second groove portion, the second connecting member comprises a second isolation portion located on the outer peripheral side of the first groove portion, an outer wall surface of the first groove portion is an inner wall surface of the second isolation portion, the second groove portion comprises a second receiving groove, and at least part of the second isolation portion is received in the second receiving groove.

2. The pipeline connection device according to claim 1, wherein a range of the first gap is 0.05 mm to 0.25 mm.

3. The pipeline connection device according to claim 1, wherein the first groove portion further comprises a second side wall farther away from the second channel than the first side wall, a second gap is provided between the abutting portion and the second side wall, and a range of the second gap is 0.05 mm to 0.3 mm.

4. The pipeline connection device according to claim 3, wherein the range of the first gap is 0.1 mm to 0.25 mm, and the range of the second gap is 0.1 mm to 0.3 mm.

5. The pipeline connection device according to claim 4, wherein the range of the first gap is 0.15 mm to 0.25 mm, and the range of the second gap is 0.15 mm to 0.25 mm; or
the range of the first gap is 0.1 mm to 0.2 mm, and the range of the second gap is 0.1 mm to 0.2 mm; or
the range of the first gap is 0.05 mm to 0.15 mm, and the range of the second gap is 0.05 mm to 0.15 mm.

6. The pipeline connection device according to claim 1, wherein the second connecting member comprises a first isolation portion between the second channel and the first receiving groove; a thickness of the abutting portion is 1.5 mm to 3 mm, a thickness of the second isolation portion is 1 mm to 2.5 mm, and a thickness of the first isolation portion is 1 mm to 2.5 mm.

7. The pipeline connection device according to claim 6, wherein the first connecting member comprises a channel main body located in a middle and a channel accommodating portion adjacent to the second connecting member, a radial dimension of the channel accommodating portion is greater than a radial dimension of the channel main body; at least part of the first isolation portion is received in the channel accommodating portion of the first channel.

8. The pipeline connection device according to claim 1, wherein the sealing member is a graphite gasket; the first connecting member comprises a first end surface facing the second connecting member, the second connecting member comprises a second end surface opposite to the first end surface;

the abutting portion protrudes from the first end surface, and the first groove portion is formed by recessing from the second end surface into the second connecting member.

9. A pipeline adapting assembly, comprising one of a heat exchanger, a flow regulating device, a gas-liquid separator and a compressor, and a pipeline connection device;

the pipeline connection device, comprising: a first connecting member, a second connecting member and a sealing member, the first connecting member and the second connecting member being fixedly connected, the first connecting member comprising a first channel and an abutting portion provided on an outer peripheral side of the first channel, the second connecting member comprising a second channel and a first groove portion provided on an outer peripheral side of the second channel, the first groove portion comprising a first receiving groove and a first side wall adjacent to the second channel;

the sealing member being received in the first receiving groove, at least part of the abutting portion being received in the first receiving groove and abutting against the sealing element;

a first gap being provided between the abutting portion and the first side wall, and the first gap is not greater than 0.3 mm;

wherein the heat exchanger is connected to the pipeline connection device, at least one of an inlet and an outlet of the heat exchanger is in communication with the first channel or the second channel;

or, the flow regulating device is connected to the pipeline connection device, at least one of an inlet and an outlet of the flow regulating device is in communication with the first channel or the second channel;

or, the gas-liquid separator is connected to the pipeline connection device, at least one of an inlet and an outlet of the gas-liquid separator is in communication with the first channel or the second channel;

or, the compressor is connected to the pipeline connection device, at least one of an inlet and an outlet of the compressor is in communication with the first channel or the second channel;

wherein the first connecting member comprises a second groove portion located on an outer peripheral side of the abutting portion, an outer wall surface of the abutting portion is an inner wall surface of the second groove portion, the second connecting member comprises a second isolation portion located on the outer peripheral side of the first groove portion, an outer wall surface of the first groove portion is an inner wall surface of the second isolation portion, the second groove portion comprises a second receiving groove, and at least part of the second isolation portion is received in the second receiving groove.

10. The pipeline adapting assembly according to claim 9, wherein a range of the first gap is 0.05 mm to 0.25 mm.

11. The pipeline adapting assembly according to claim 9, wherein the second connecting member comprises a first isolation portion between the second channel and the first receiving groove, the first groove portion surrounds the first isolation portion, the first connecting member and the second connecting member comprise no more than two annular friction surfaces in contact with each other; a height of the sealing member along an axial direction of the pipeline connection device is equal to or smaller than a depth of the first receiving groove;

wherein a ratio of the height of the sealing member to the depth of the first receiving groove is X, wherein $0.6 \leq X \leq 1$;

wherein the pipeline connection device further comprises a ring member sleeved on an outside of the sealing member, and the ring member is adapted for restricting expansion of the sealing element in a radial direction when the abutting portion presses the sealing element; and wherein the sealing member is a graphite gasket, and a density of the sealing member after being abutted by the abutting portion is greater than 1.8 g/cm$^3$.

12. The pipeline adapting assembly according to claim 11, wherein the first connecting member comprises a channel main body located in a middle and a channel accommodating portion adjacent to the second connecting member, a radial dimension of the channel accommodating portion is greater than a radial dimension of the channel main body; at least part of the first isolation portion is received in the channel accommodating portion of the first channel.

13. The pipeline adapting assembly according to claim 9, wherein the sealing member is a graphite gasket; the first connecting member comprises a first end surface facing the second connecting member, the second connecting member comprises a second end surface opposite to the first end surface;

the abutting portion protrudes from the first end surface, and the first groove portion is formed by recessing from the second end surface into the second connecting member.

* * * * *